US007394819B2

(12) United States Patent
Chen et al.

(10) Patent No.: US 7,394,819 B2
(45) Date of Patent: *Jul. 1, 2008

(54) BROADBAND COMMUNICATIONS ACCESS DEVICE

(75) Inventors: Steven Chien-Young Chen, Derwood, MD (US); Ray Wang, McLean, VA (US)

(73) Assignee: 3E Technologies International, Inc., Rockville, MD (US)

( * ) Notice: Subject to any disclaimer, the term of this patent is extended or adjusted under 35 U.S.C. 154(b) by 982 days.

This patent is subject to a terminal disclaimer.

(21) Appl. No.: 10/442,518

(22) Filed: May 21, 2003

(65) Prior Publication Data
US 2004/0047358 A1 Mar. 11, 2004

Related U.S. Application Data

(63) Continuation of application No. 09/773,103, filed on Jan. 31, 2001.

(51) Int. Cl.
*H04L 12/28* (2006.01)
(52) U.S. Cl. .................. 370/401; 370/352; 370/328; 725/74
(58) Field of Classification Search .......... 370/230, 370/235, 270, 276, 352, 389, 400, 401, 466, 370/467, 468, 351, 353, 419, 420, 421, 431, 370/432, 341, 343, 349, 328, 338; 379/219, 379/114.03, 114.05, 114.21, 110.01, 201.04; 725/14, 103, 31, 82, 74; 455/417, 54.1, 426.1–426.2, 455/462, 556.1, 557, 554.2, 550.1, 74; 375/222; 345/864; 709/203
See application file for complete search history.

(56) References Cited

U.S. PATENT DOCUMENTS

| 5,247,347 | A | 9/1993 | Litteral |
| 5,408,260 | A | 4/1995 | Arnon |
| 5,519,731 | A | 5/1996 | Cioffi |
| 5,521,906 | A | 5/1996 | Grube et al. |
| 5,572,575 | A | 11/1996 | Yamamoto |
| 5,596,624 | A | 1/1997 | Armbruster et al. |
| 5,619,505 | A | 4/1997 | Grube et al. |
| 5,627,501 | A | 5/1997 | Biran et al. |
| 5,752,162 | A | 5/1998 | Sawyer et al. |

(Continued)

FOREIGN PATENT DOCUMENTS

WO WO 99/12330 3/1997

(Continued)

OTHER PUBLICATIONS

ADSLForumTR-001 "ADSL Forum System References Model," ADSL Technical Report, May 1996, pp. 1-7.

(Continued)

*Primary Examiner*—Ian N Moore
(74) *Attorney, Agent, or Firm*—Lesavich High-Tech Law Group, P.C.; Stephen Lesavich

(57) ABSTRACT

An integrated phone-based home gateway system. The integrated phone-based home gateway system is a multi-function wireless and wired networking, wireless and wired telephony, broadband, gateway device. It provides gateway, routing and bridging functionality, automatic wireless and wired broadband initialization, configuration and service provisioning for allocating, configuring and maintaining multiple transmission channels and virtual communications paths used for wired and wireless broadband communications.

15 Claims, 14 Drawing Sheets

U.S. PATENT DOCUMENTS

| | | |
|---|---|---|
| 5,822,374 A | 10/1998 | Levin |
| 5,842,126 A | 11/1998 | Sawyer et al. |
| 5,889,856 A | 3/1999 | O'Toole et al. |
| 5,910,970 A | 6/1999 | Lu |
| 5,911,120 A | 6/1999 | Jarett |
| 5,953,664 A | 9/1999 | Sawyer et al. |
| 5,963,620 A * | 10/1999 | Frankel et al. ........... 379/93.05 |
| 5,999,518 A | 12/1999 | Nattkemper et al. |
| 6,049,531 A | 4/2000 | Roy |
| 6,157,935 A | 12/2000 | Tran et al. |
| 6,167,120 A | 12/2000 | Kikinis |
| 6,208,637 B1 | 3/2001 | Eames |
| 6,282,189 B1 | 8/2001 | Eames |
| 6,396,531 B1 | 5/2002 | Gerszberg |
| 6,396,837 B1 | 5/2002 | Wang |
| 6,404,761 B1 | 6/2002 | Snelling |
| 6,405,027 B1 | 6/2002 | Bell |
| 6,424,636 B1 | 7/2002 | Seazholtz |
| 6,452,923 B1 * | 9/2002 | Gerszberg et al. ........... 370/466 |
| 6,505,255 B1 | 1/2003 | Akatsu |
| 6,526,581 B1 * | 2/2003 | Edson .................. 725/74 |
| 6,542,465 B1 | 4/2003 | Wang |
| 6,636,505 B1 | 10/2003 | Wang |
| 6,640,239 B1 * | 10/2003 | Gidwani ................ 370/353 |
| 6,650,871 B1 | 11/2003 | Cannon |
| 6,678,215 B1 | 1/2004 | Treyz |
| 6,690,675 B1 | 2/2004 | Kung |
| 6,731,627 B1 | 5/2004 | Gupta |

FOREIGN PATENT DOCUMENTS

| | | |
|---|---|---|
| WO | WO 98/47251 | 10/1998 |

OTHER PUBLICATIONS

Technical Report TR-002 "ATM over ADSL Recommendations," ADSL Forum System Technical Report, Mar. 1997, pp. 1-17.

Technical Report TR-007 "Interfaces and System Configurations for ADSL: Customer Premises," ADSL Forum System Technical Report, Mar. 1998, pp. 1-26.

Kyees, P.J. et al., *ADSL: A New Twisted-Pair Access to the Information Highway*, IEEE Communications Magazine, vol. 33, Issue 4, Apr. 1995, pp. 52-60.

Huang, Yin-Hwa et al., *Design of an MPEG-Based Set-Top Box for Video on Demand Services. Acoustics, Speech and Signal Processing*, 1995, {CASSP-95., 1995 International Conference, vol. 4, ISBN: )-7803-2431-5, May 9-12, 1995, pp. 2655-2658.

* cited by examiner

WIRELESS PICONET

INTEGRATED PHONE-BASED HOME GATEWAY INTERFACE
HARDWARE ARCHITECTURE

WIRELESS, INTEGRATED PHONE-BASED HOME GATEWAY
INTERFACE HARDWARE ARCHITECTURE

INTEGRATED PHONE-BASED HOME GATEWAY INTERFACE SOFTWARE ARCHITECTURE

SESSION MANAGER SOFTWARE ARCHITECTURE

SERVICE MANAGER SOFTWARE ARCHITECTURE

INTERFACE MANAGER SOFTWARE ARCHITECTURE

DISPLAY MANAGER SOFTWARE ARCHITECTURE

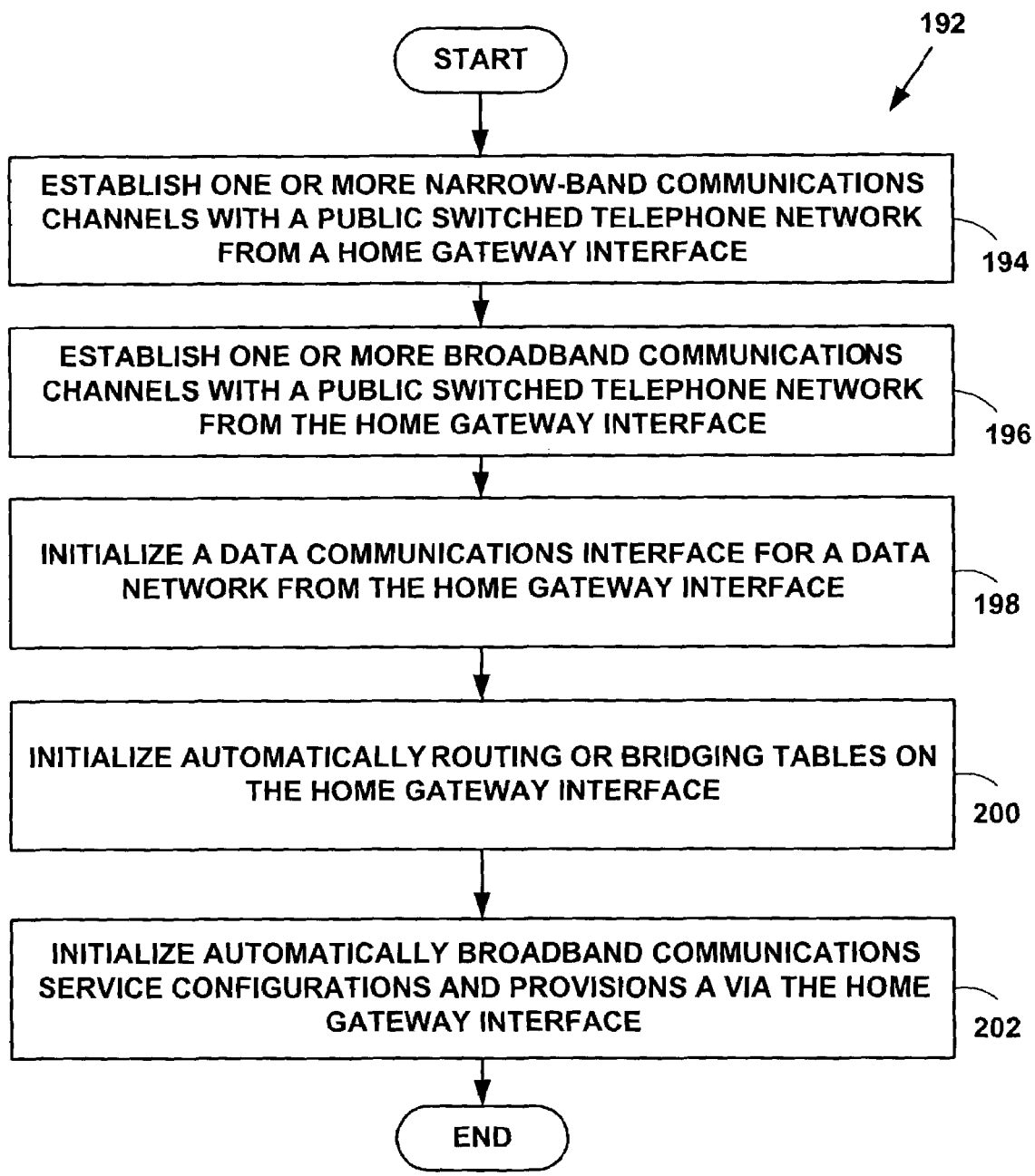

US 7,394,819 B2

BROADBAND COMMUNICATIONS ACCESS DEVICE

This application is a Continuation of U.S. application Ser. No. 09/773,103 filed on Jan. 31, 2001, that claims priority from U.S. Provisional Patent Application Nos. 60/179,042, filed on Jan. 31, 2000, and 60/189,870, filed on Mar. 16, 2000, the contents of which are incorporated herein by reference. This U.S. Continuation application also claims priority from Taiwan Patent Application No. 89109172, filed on May 12, 2000, now Taiwan Patent No. 145,071, which claims priority from U.S. Provisional Patent Application 60/189,870, filed on Mar. 16, 2000.

FIELD OF THE INVENTION

This invention relates to communications devices. More specifically it relates to a broadband communications devices including phone-based home gateway interfaces.

BACKGROUND OF THE INVENTION

With the advent of the communication technologies and breakthroughs in Digital Signal Processing ("DSP"), Digital Subscriber Lines ("DSL"), fiber optic and coaxial cable and wireless connections, more bandwidth is now available for home communications than was once provided by traditional voice-grade analog modems. There is widespread interest among home users in faster access to content provided by service providers via high-speed facilities such as DSL, cable, or wireless connections.

This interest appears to be driving the evolution of the home communications from narrow-band communications to broadband communications. As is known in the art, broadband communications include communications signals that are typically transmitted over separate inbound and outbound channels. Network devices on a broadband network are connected by copper, coaxial or fiber-optic cable or wireless connections that can carry data, voice, and video simultaneously. Broadband communications are capable of high-speed operation (e.g., megabits-per-second, ("Mbps")).

There are a number of problems associated with providing broadband communications to the home environment. One problem is that before DSL, broadband access via shared Local Area Network ("LAN"), Frame Relay, Asynchronous Transmission Mode ("ATM") or other broadband communications services had only been used in commercial or business environment. Most to-home communications are narrow-band and use either Integrated Service Digital Network ("ISDN") line or analog modems.

Another problem is that broadband communications are operationally complex. Broadband communications typically include a large number of broadband communications parameters that must be configured before a broadband communications application can be used. Service provisioning is also required to use broadband communications. As is known in the art, service provisioning includes allocating, configuring and maintaining multiple transmission channels and virtual communications paths used for broadband communications.

Normally, in the commercial or business environment, trained professionals are required to manage such complexity. It is undesirable however, to have trained networking personnel managing a home network. It may also be unreasonable to expect any home user to have enough networking experience to configure and provision broadband communications in the home environment.

Another problem is that it is becoming common for home users to have small office or home office ("SOHO") home networks. Such home networks typically include one or more personal computers, printers, facsimile machines, mobile phones, personal data assistants ("PDA") that are all connected in the home and to another networks such as the Internet. The home networks typically require gateway, router or bridge functionality to allow devices connected to the home network to communicate over data connections (e.g., Internet Protocol ("IP")) with other devices connected to the Internet.

As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another.

Such gateway, router or bridge functionality typically requires configuration, initialization and management of various gateway, routing or bridging tables. It may also be unreasonable to expect any home user to have enough networking experience to configure, initialize or manage such tables in the home environment.

Another problem is that for many home users do not have the physical space to include additional modules or equipment that is used as a home gateway. The home users also may not have the additional wired or wireless connections available to connect a home gateway (e.g., an additional telephone line).

Another problem is that many home users desire to use home gateway functionality, but already have existing phone systems. Many existing phone systems, are incompatible with, and cannot be used with products that may offer any type of home gateway functionality.

Another problem is that many devices used on a home network are wireless. It is often necessary to connect such wireless devices to a broadband communications path.

Another problem is that most broadband communication devices allow to-home networking, but do not allow in-home networking with other devices connected to a home network. It is often necessary to provide broadband communications for to-home and in-home networking.

Thus, it is desirable to provide broadband communications to the home environment in a device that overcomes the problems described herein and other problems associated with providing broadband communications to the home.

SUMMARY OF THE INVENTION

In accordance with preferred embodiments of the present invention, some of the problems associated with providing broadband communications to the home environment are overcome. An integrated phone-based home gateway system is disclosed.

The integrated phone-based home gateway system is a multi-function wireless and wired networking, wireless and wired telephony, broadband, gateway device that provides automatic wireless and wired broadband initialization, configuration and service provisioning, and gateway, routing and bridging functionality.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 13 is a flow diagram illustrating a method for initializing communications from a home gateway interface.

DETAILED DESCRIPTION OF PREFERRED EMBODIMENTS

Exemplary Phone-Based Home Gateway Systems

Figure 1:
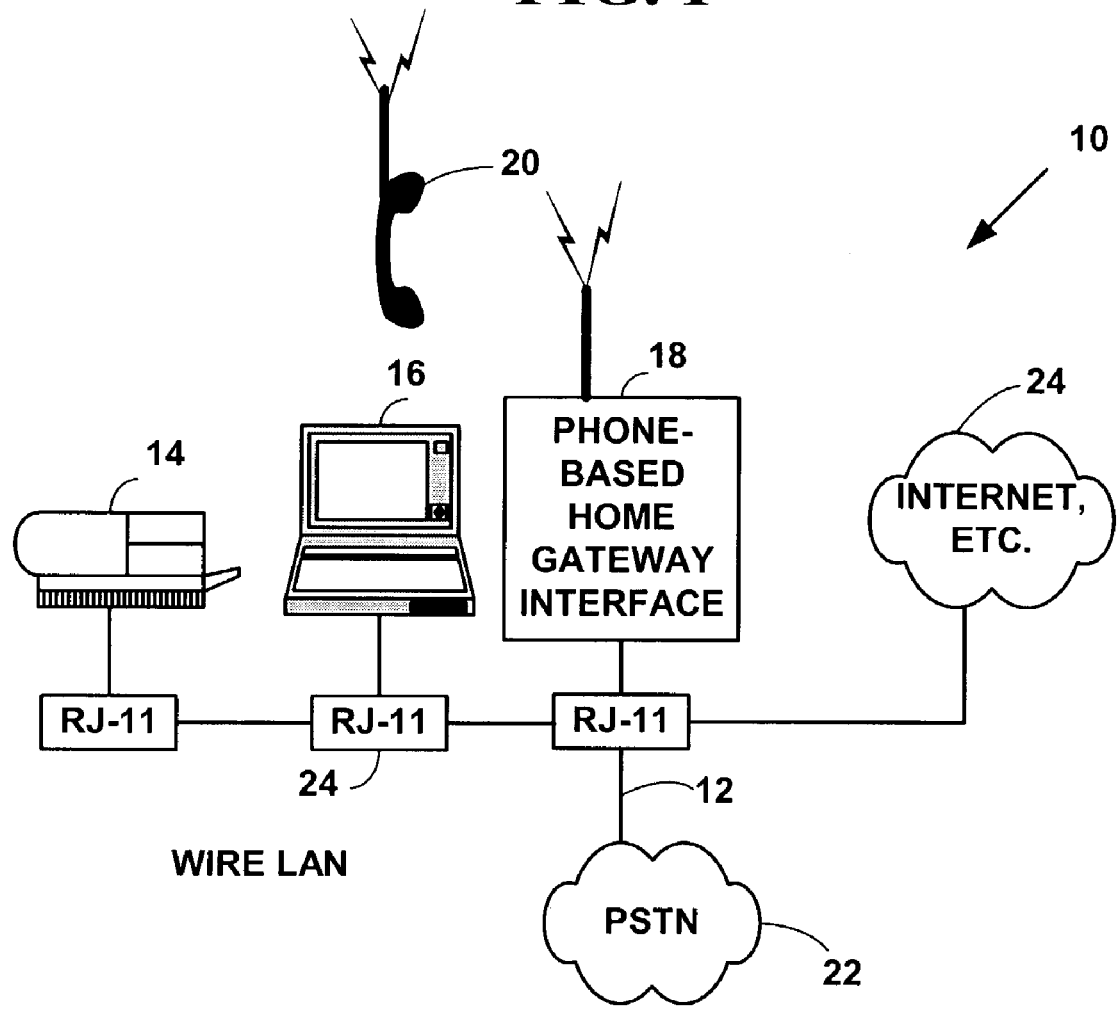
FIG. 1 is a block diagram illustrating an exemplary phone-based home gateway system.

FIG. 1 illustrates an exemplary phone-based home gateway system 10 for one exemplary embodiment of the present invention. As is known in the art, a gateway connects computer networks using different network protocols and/or operating at different transmission capacities. The exemplary phone-based home gateway system 10 includes a local area network ("LAN") 12 with one or more network devices 14, 16, two of which are illustrated, and a phone-based home gateway interface 18 with an optional portable telephony handset 20. If the optional portable telephony 20 handset is not used, the phone-based home gateway interface 18 includes a speaker-phone with a built in microphone and speaker for sending and receiving voice information. The network devices 14, 16 include, but are not limited to, personal computers, printers, personal data assistants ("PDAs"), network appliances and other electronic devices.

The phone-based home gateway interface 18 is connected to a public switched telephone network ("PSTN") 22 via one or more twisted pairs of copper wires, coaxial cable, fiber optic cable, other connection media or other connection interfaces such as wireless interfaces. The PSTN 22 is any public switched telephone network provided by AT&T, GTE, Sprint, MCI and others. The phone-based home gateway interface 18 may also be connected to other computer networks 24 such as the Internet, an intranet, etc. via coaxial cable, fiber optic cable other connection media or other connection interfaces such as wireless interfaces.

The phone-based home gateway interface 18 may also be connected to other telephony networks via a wireless local loop. The network devices 14, 16 are connected to LAN 12 with RJ-11 interfaces 24. As is known in the art, a Registered Jack-11 ("RJ-11") interface is a four or six-wire connector used primarily to connect network devices to telephony equipment and to local area networks.

However, the present invention is not limited to such an embodiment and more, fewer or equivalent components can also be used in the phone-based home gateway system 10. In addition, the phone-based home gateway interface 18 is illustrated as separate device from the network devices 14, 16. However, the phone-based home gateway interface 18 may also be an internal component in a network device 14, 16.

Preferred embodiments of the present invention include network devices and home gateway interfaces that are compliant with all or part of standards proposed by the Institute of Electrical and Electronic Engineers ("IEEE"), International Telecommunications Union-Telecommunication Standardization Sector ("ITU"), Internet Engineering Task Force ("IETF"), American National Standard Institute ("ANSI"), Wireless Application Protocol ("WAP") Forum, Bluetooth Forum, or the ADSL Forum. However, network devices based on other standards could also be used. IEEE standards can be found on the World Wide Web at the Universal Resource Locator ("URL") "www.ieee.org." The ITU, (formerly known as the CCITT) standards can be found at the URL "www.itu.ch." IETF standards can be found at the URL "www.ietf.org." The ANSI standards can be found at the URL "www.ansi.org." Bluetooth Forum documents can be found at the URL "www.bluetooth.com." WAP Forum documents can be found at the URL "www.wapforum.org." ADSL Forum documents can be found at the URL "www.adsl.com."

An operating environment for network devices and home gateway interfaces of the present invention include a processing system with one or more high speed Central Processing Unit(s) ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU executed" or "processor executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

The phone-based home gateway interface 18 provides broadband communications in the megabits-per-second or higher range. The phone-based home gateway interface 18 also provides routing or bridging for networking communications and automatically initializes communications service configurations and provisions communications services. As is know in the art, a router is an intermediary device on a communications network that expedites message delivery. A router receives transmitted messages and forwards them to their correct destinations over the most efficient available route. A bridge is a device that connects networks using the same communications protocols so that information can be passed from one network device to another.

The phone-based home gateway interface 18 is connected to the PSTN 22 via one or more high-speed telephony interfaces to provide broadband communications, and/or one or more low-speed telephony interfaces to provide other telephony communications. The phone-based home gateway interface 18 is also connected to the Internet 24, or other computer network via one or more data interfaces, such as Internet Protocol ("IP") interfaces to provide data communications.

As is known in the art, IP is a routing protocol designed to route traffic within a network or between networks. IP is described in IETF RFC-791, incorporated herein by reference. However, the present invention is not limited to IP data interfaces and other data interfaces can also be used.

The phone-based home gateway interface 18 allows multiple home users to access the Internet, other computer networks and content services for conducting e-commerce, receiving content news, entertaining on-demand, making audio or video communications, and telecommuting or working at home. This phone-based home gateway interface 18 allows in-home as well as to-home networking and allows resource sharing among home devices via the existing phone wire, wireless, coaxial or optical cable connections.

Figure 2:
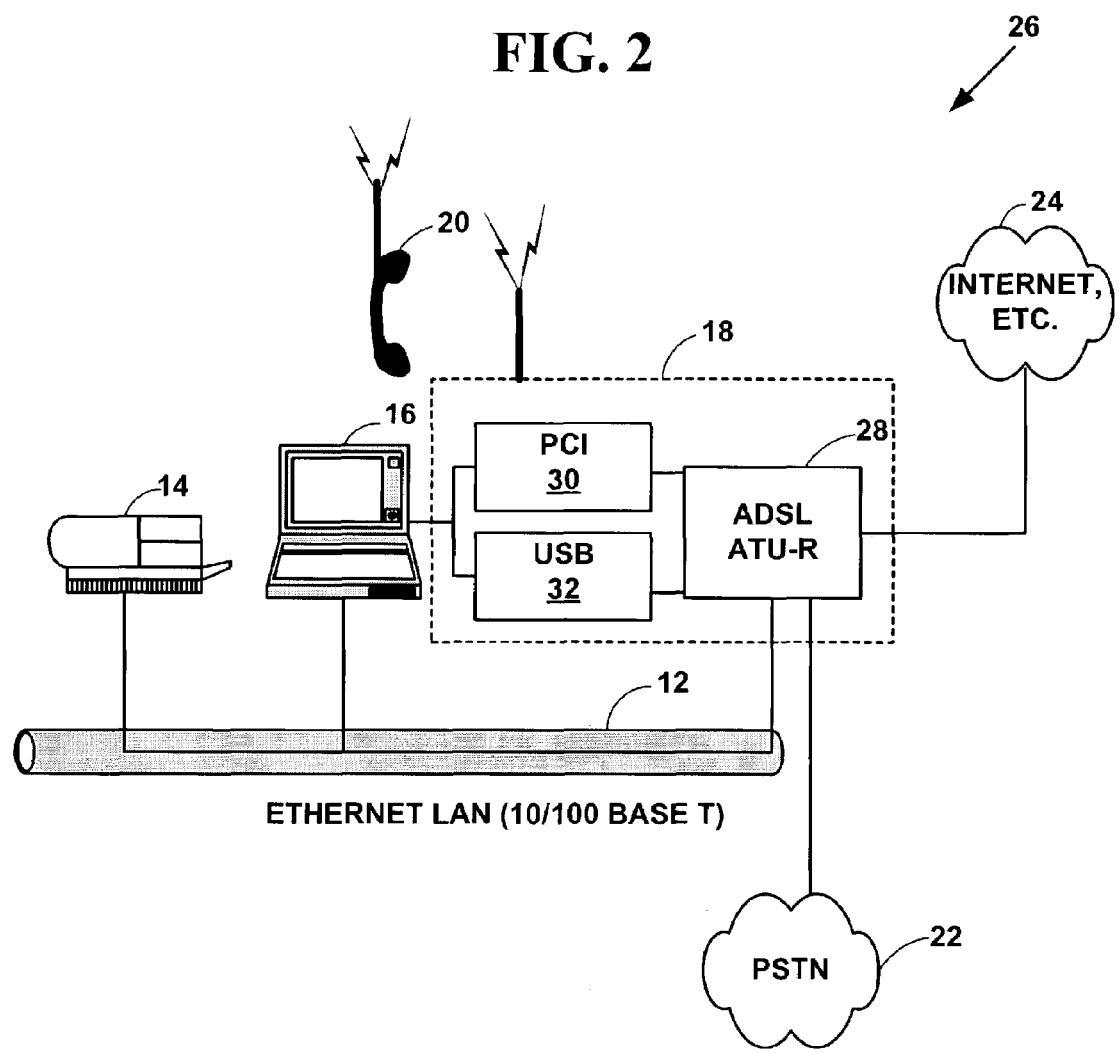
FIG. 2 is a block diagram illustrating an ADSL component of a phone-based home gateway system.

FIG. 2 is a block diagram 26 illustrating an Asymmetric Digital Subscriber Line ("ADSL") component 28 of the phone-based home gateway interface 18. The ADSL component 28 is illustrated as integral to the phone-based home gateway interface 18. However, the ADSL component 28 can also be an external or separate component of the phone-based home gateway interface 18.

As is known in the art, ADSL is a communications technology that transmits an asymmetric data stream over a conventional twisted pair of copper telephone wires. An ADSL typically transmits a larger data rate downstream to a subscriber from a telephony switching office than from a subscriber back to the telephony switching office. ADSLs typically transmit about 1.5 Mega bits-per-second ("Mbps") to about 9 Mbps downstream to a subscriber, and about 16 kilo-bps ("kbps") to 640 kbps upstream back to a telephony switching office.

However, the phone-based home gateway interface 18 may also include a symmetric, other or equivalent communications component and the present invention is not limited to the ADSL component 28. The ADSL component 28 allows the phone-based home gateway interface 18 to be used to provide broadband, or other faster transmission rates than can be obtained with analog modems over a conventional telephone wire.

An ADSL system typically comprises two asymmetric devices connected by a conventional twisted pair of copper wires. An ADSL Transmission Unit-Central ("ATU-C") is a device at one end of an ADSL connection at a telephony or other switching office on the PSTN 22 or other network. An ADSL Transmission Unit-Remote ("ATU-R") is a device at another end of an ADSL connection at a subscriber or customer site. The ADSL connection can be used either with or without a splitter.

Returning to FIG. 2, the phone-based home gateway interface 18 includes an ADSL terminating unit (ATU-R) 28 that is used to connect the phone-based home gateway interface 18 to the LAN 12. In another embodiment of the present invention, the LAN 12 can also include a 10/100 Base-T Ethernet LAN as is illustrated in FIG. 2. As is known in the art, 10/100 Base-T is an Ethernet standard for LANs using twisted-pair cable transmitting at 10 to 100 Mbps. However, the present invention is not limited to such an embodiment, and other or equivalent LANs can also be used. The ATU-R 28 is also used to connect to network devices 14, 16 to the PSTN 22 via a peripheral component interconnect ("PCI") 30 bus or a Universal Serial Bus ("USB") 32 connection.

As is know in the art, a PCI is a local bus standard. Most modern computers include a PCI bus 30. PCI is a 64-bit bus, though it is usually implemented as a 32-bit bus. As is known in the art, a USB 32 is an external bus standard that supports data transfer rates of up to 12 Mbps or higher. A single USB port can be used to connect up to 127 peripheral devices such as mice, modems, and keyboards. USB also supports plug-and-play installation and hot plugging. Plug-and-play refers to the ability of a computer system to automatically configure expansion boards and other devices without worrying about setting DIP switches, jumpers and other hardware and software configuration elements.

Exemplary Integrated Phone-Based Home Gateway System

Figure 3:
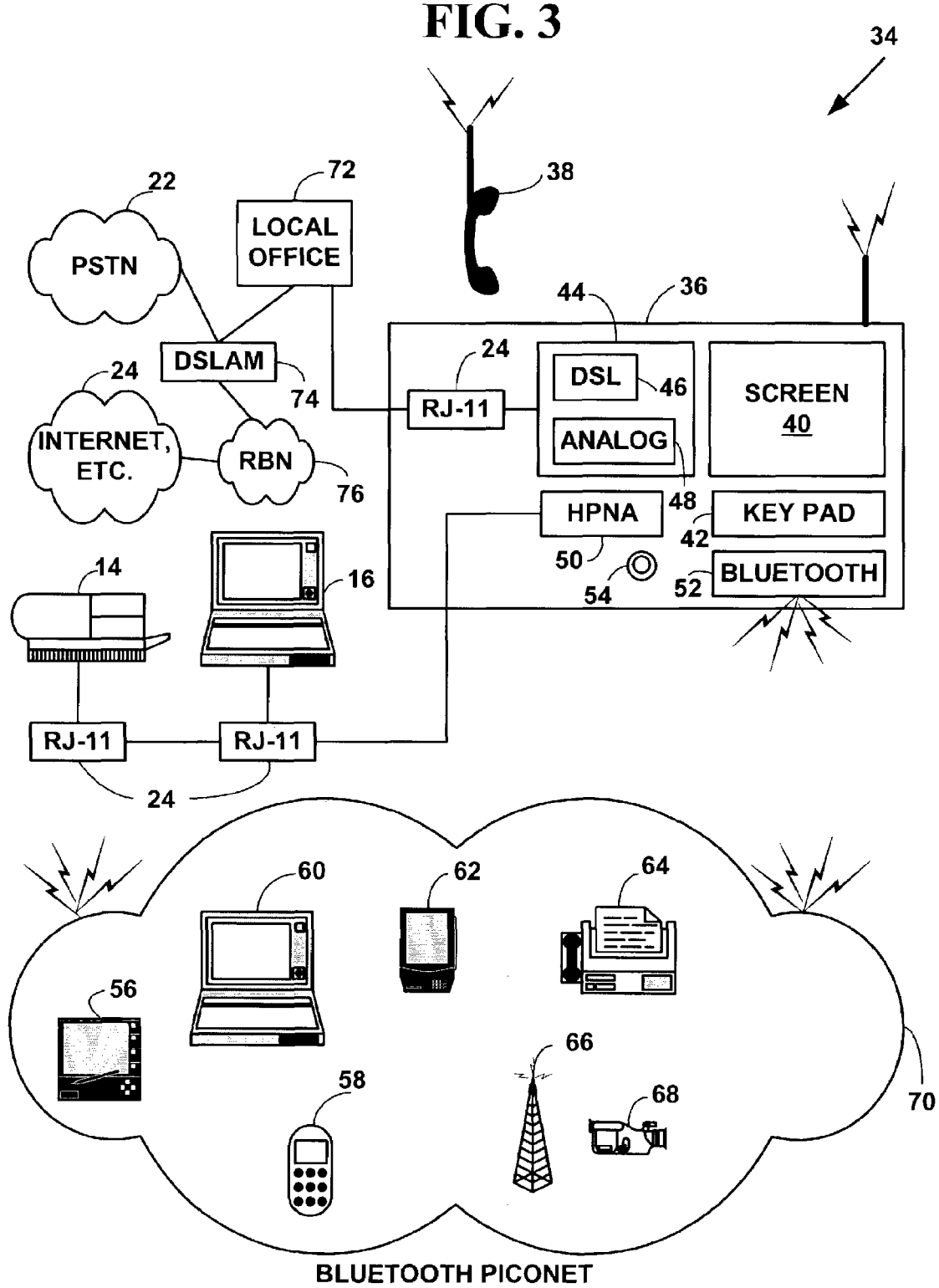
FIG. 3 is a block diagram illustrating an integrated phone-based home gateway system.

FIG. 3 is a block diagram illustrating an integrated phone-based home gateway system 34. The integrated phone-based home gateway system 34 includes an integrated, phone-based home gateway interface 36 with an optional portable wireless handset 38, a display screen 40, a key pad 42, a communications interface 44 including a DSL component 46 and an analog component 48, a home phoneline network adapter ("HPNA") component 50, a Bluetooth component 52, and an optional video camera component 54. The integrated phone-based home gateway system 34 also includes one or more processors, one more banks of memory and one or more software modules (not illustrated in FIG. 3). However, the present invention is not limited to such an embodiment and more, fewer or equivalent components can also be used in the integrated phone-based home gateway system 34. The integrated phone-based home gateway system 34 provides "in-home" as well as "to-home" networking for voice, video and data.

The integrated, phone-based home gateway interface 36 may include one or more physical buttons or controls for selecting features of a base station. One or more graphical buttons or controls may also be included on the display screen 40. The integrated, phone-based home gateway interface 36 is modular and allows the components described above and other or equivalent types of components to be easily interchanged.

The integrated, phone-based home gateway interface 36 may include an optional portable wireless telephone handset 38 that allows a user to use the handset 38 in the vicinity of the integrated, phone-based home gateway interface 36. In one embodiment of the present invention, the handset 38 is a 4-in-1 phone set including a cordless phone, mobile phone, web-phone (e.g., for Voice over IP ("VoIP")) and walkie-talkie radio capabilities. However, the present invention is not limited to such an embodiment and other or equivalent handsets can also be used. In addition, the handset 38 can also provide only one, two or three of the 4-in-1 phone set capabilities.

If the optional portable wireless handset 38 is not used, the communications interface 44 may include a speaker-phone with a built in microphone and speaker for sending and receiving voice information. The communications interface 44 may include a speaker-phone whether or not the portable wireless handset 38 is used.

The integrated, phone-based home gateway interface 36 also provides routing or bridging for networking communications, including voice, video and data communications and coordinates establishing, initializing and provisioning broadband, narrow-band and data communications parameters and channels. In one embodiment of the present invention, this functionality is provided in integrated, phone-based home gateway interface 36 with software modules illustrated in FIGS. 7-11. However, the present invention is not limited to such an embodiment, and this functionality can also be provided in firmware, hardware, or software, or any combination thereof.

The display screen 40 includes a conventional computer display screen, a liquid crystal display screen with color, black and white or grey scale capabilities, or other types of display screens, including touch screens. The display screen 40 is used to display and access voice, video, data and other Internet messages (e.g., e-mail). In one embodiment of the present invention, the display screen 40 is a removable module that can be used as portable wireless hand-held device (e.g., infra-red, Bluetooth, other wireless, etc.) in the vicinity of the integrated, phone-based, home gateway interface 36. In one embodiment of the present invention, the display screen 40 is used to display at least one line of real-time stock quote, weather, headline news, community news, electronic address, or other information from the Internet 24. The optional video camera component 54 is used to collect and send data for video conference calls, video e-mail, etc.

The keypad 42 includes a telephone key pad, other numeric keypad, an alpha-numeric keypad, other specialized key pad, a keyboard, or other alpha-numeric data entry device. The keypad 42 can include physical devices as well as graphical representations of key pads that are made available on the display screen 40.

The communications interface 44 includes a DSL component 46 and an analog component 48. The DSL component 46 provides broadband communications. The DSL component 46 may include a DSL device with one of the following interfaces: ADSL, symmetric DSL ("SDSL"), high-bit-rate DSL ("HDSL") or very-high-bit-rate ("VDSL"). The DSL component 46 is integrated inside a phone set, which provides conventional telephony as well as an always-on connectivity to broadband networks, the Internet or other computer networks. The analog component 48 may include analog modems, such as a V.90 56 kbps or other analog modems operating at a different speed or using a different communication protocol than the DSL component 46. In one embodiment of the present invention, the analog component 48 includes using plain old telephone service ("POTS"), and is also integrated inside a phone set for the purpose of providing channel redundancy, broadband service provisioning and configuration.

In one embodiment of the present invention, the communications interface 44 is connected to a POTS splitter that allows the DSL component 46 and the analog component 48 to use the same twisted pairs of telephone lines (See FIG. 6). The POTS splitter may also be used to provide broadband as well as other higher-bandwidth services (e.g., Asynchronous Transport Mode ("ATM"), Optical transmission, Integrated Services Digital Network, ("ISDN"), Frame Relay, etc.) and lower-bandwidth services (e.g., POTS).

The HPNA component 50 provides a convenient and flexible way to interconnect computers and peripherals to a network, including plug-and-play. The HPNA component 50 also enables existing telephone wiring to be used for broadband network access. In addition, HPNAs enable VoIP phones that have Ethernet connectors to interface with non-Ethernet broadband connections. FIG. 3 illustrates network devices 14, 16, comprising a small home network connected to the HPNA 50 via RJ-11 interfaces 24. However, the present invention is not limited to such an embodiment. In addition, the network devices 14, 16 can also be connected using PCI 30 or USB 32 connections (FIG. 2) as was described above.

The Bluetooth component 52 simplifies data synchronization and transmission between network devices and the LAN 12 with a common short-range wireless protocol. As is known in the art, Bluetooth is a short-range radio frequency technology aimed at simplifying communications among network devices and between network devices. Bluetooth wireless technology supports both short-range point-to-point and point-to-multipoint connections. The Bluetooth specification, version 1.0, 1999, is incorporated by reference. In another embodiment of the present invention, the Bluetooth component can be replaced with virtually any other short-range radio interface component.

In one embodiment of the present invention, wired and wireless home electronic or other electronic devices, such as a WEB pad 56, a mobile phone 58, a lap top or notebook computer, a desk top personal computer 60, a PDA 62, smart appliances 64, alarm systems 66, home video monitoring equipment 68, etc. may interface with the integrated phone-based home gateway interface 36 through modular interfaces (e.g., RJ-11 or HPNA interfaces) or Bluetooth wireless interfaces. The wireless devices are connected to the integrated phone-based home gateway interface 36 over a Bluetooth piconet 70 or Bluetooth scatternet using the Bluetooth component 52.

As is known in the art, a "piconet" is a network in which "slave" devices can be set to communicate with a "master" radio controller in one device such as a gateway. Piconet are typically limited to a certain range and vicinity in which wireless devices must be present to operate (e.g., a few feet up to few miles away from the master radio controller). Several "piconets" can be established and linked together in "scatternets" to allow communication among several networks providing continually flexible configurations.

In one embodiment of the present invention, the communications interface 44 is connected to a local switching office 72 on the PSTN 22 via a RJ-11 jack 24. The RJ-11 jack 24 provides narrow band (e.g., voice) and broadband communications and data communications via the PSTN 22 and Internet 24. The local switching office 72 is connected to a digital subscriber line access multiplexer ("DSLAM") 74, which is in turn in communications with other telephony equipment via the PSTN 22. As is known in the art, a DSLAM concentrates individual voice lines to T1 lines, wireless antenna sites, Private Branch Exchanges ("PBXs"), Optical Network Units ("ONUs") or other carrier systems. The DSLAM 74 may also be connected to a regional broadband network ("RBN") 76, or other broadband or narrow-band voice, video or data networks which in turn may be communications with other networking equipment on the Internet 24.

The integrated phone-based home gateway system 34 provides gateway functionality, broadband communications as well as normal voice telephony to the home environment. The integrated, phone-based home gateway interface 36 is a modular, flexible home network appliance, as well as broadband or narrow-band telephony and data communications device that provides in-home as well as to-home networking.

Exemplary Wireless Integrated Phone-Based Home Gateway System

Figure 4:
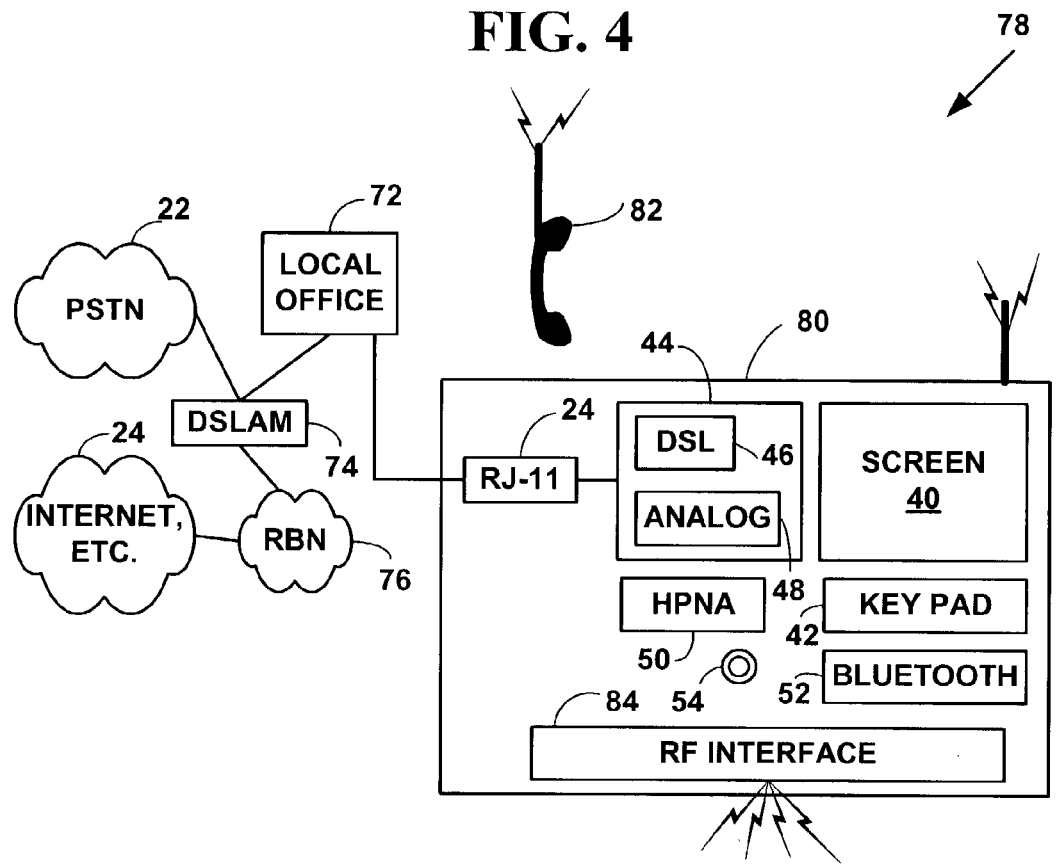
FIG. 4 is a block diagram illustrating a wireless, integrated phone-based home gateway system.
Figure 4:
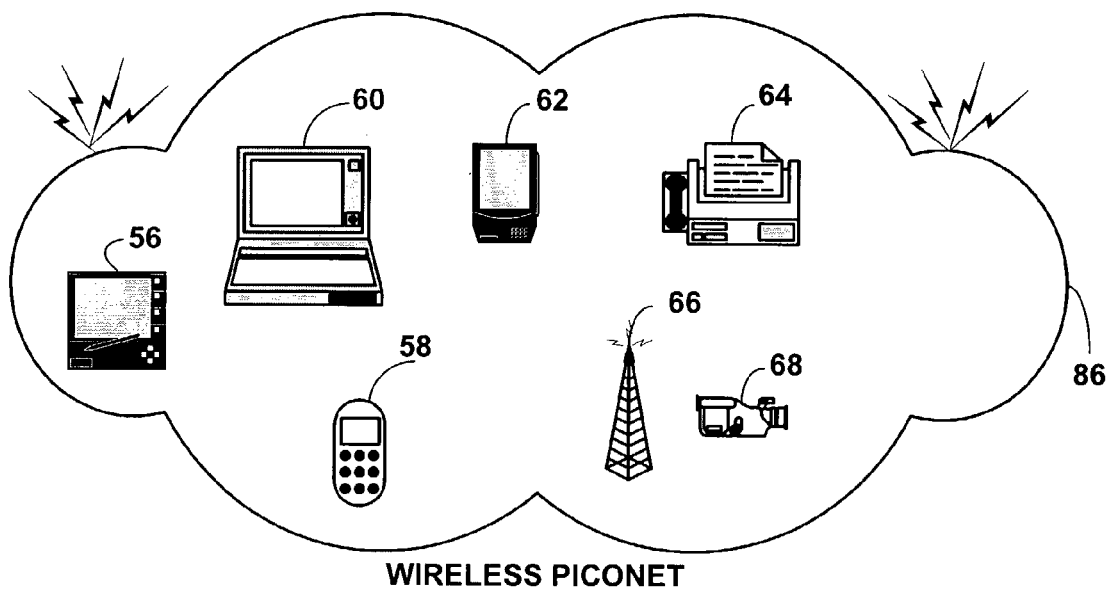

FIG. 4 is a block diagram illustrating a wireless, integrated phone-based home gateway system 78. In such an embodiment, the wireless, integrated phone-based home gateway system 78 is typically not connected directly to any other network device with any wires. In one embodiment of the present invention, all connection are wireless, including those to the PSTN 22 and the Internet 24. In another embodiment of the present invention, all connections to network devices are wireless, however, connections to the PSTN 22 and/or the Internet 24 may be with wires as is illustrated in FIG. 4. However, the present invention is not limited to such embodiments and the wireless, integrated, phone-based home gateway system 78 can also be used with a variety of other connection options.

The wireless, integrated, phone-based home gateway system 78 includes a wireless, integrated phone-based home gateway interface 80 and optional portable wireless telephone handset 82. The wireless, integrated phone-based home gateway interface 80 includes the same components as the integrated phone-based home gateway interface 36 described above for FIG. 3. In addition, the wireless phone-based home gateway interface 80 includes an additional plug-in radio frequency ("RF") interface 84.

In one embodiment of the present invention, the RF interface 84 is an IEEE standard 802.11b wireless interface. However, the present invention is not limited to such an embodiment and other wireless interfaces can also be used. For example, the RF interface can include RF Home and other wireless interfaces. As is known in the art, the IEEE 802.11b standard defines wireless interfaces that provide up to 11 Mbps wireless data transmission to and from wireless devices over short ranges. The IEEE 802.11b standard is incorporated herein by reference.

As is known in the art, RF Home is a standard for wireless networking access devices to both local content and the Internet for voice, data and streaming media in home environments. More information on RF Home can be found at the URL "www.homerf.org." RF Home includes the Shared Wireless Access Protocol ("SWAP"). The SWAP specification defines a new common interface protocol that supports wireless voice and data networking in the home. The RF Home SWAP protocol specification, March 1998, is incorporated herein, by reference.

In one embodiment of the present invention, the RF interface 84 is a short-range RF interface that is capable of communicating with wireless devices over a wireless piconet 86 or wireless scatternet using wireless communications protocols. In another embodiment of the present invention, the RF interface 78 is a long-range radio interface (e.g., WAP interface) used for communicating with wireless devices on wireless networks outside the range of a wireless piconet 80. In yet another embodiment of the present invention, the RF interface 78 includes both short-range and long-range RF interfaces. However, the RF interface 78 can be virtually any other or equivalent short-range or long-range RF interface and the present invention is not limited to the short-range or long-range RF interfaces described.

Figure 5:
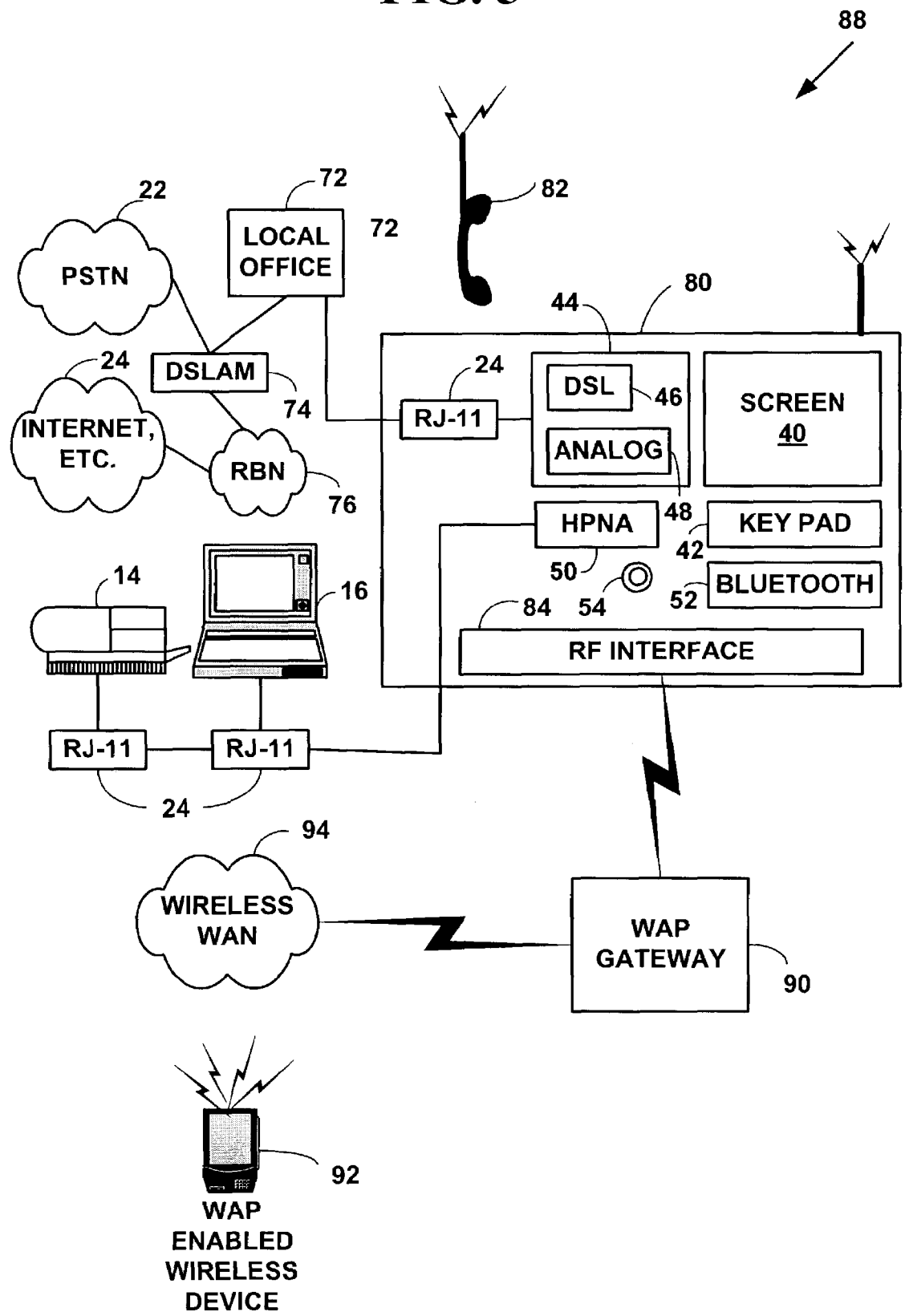
FIG. 5 is a block diagram illustrating to-home wireless networking with the wireless, integrated phone-based home gateway system of FIG. 4.

FIG. 5 is a block diagram illustrating "to-home" wireless networking 88 with the phone-based, integrated, wireless phone-based home gateway system 78. The wireless, integrated, phone-based home gateway system 78 can be used to provide long range to-home wireless networking as well as long range in-home wireless networking with wireless protocols.

For example, the wireless, integrated, phone-based home gateway interface 80 can be in communications with a WAP gateway 90 to provide long-range to-home wireless networking at the wireless, integrated phone-based home gateway interface 80 from a WAP enabled devices 92 or other long-range wireless devices via a wireless wide-area network ("WAN") 94. The "Wireless Application Protocol Architecture Specification", by the Wireless Application Protocol Forum, WAP-100-WAPArch-1998-0430-a, April, 1998, is incorporated herein by reference. The wireless wide-area network 88 allows devices outside a certain range and vicinity (e.g., greater than a few miles and/or outside the range of a piconet) to be in communications with the wireless, integrated phone-based home gateway interface 80.

The wireless, integrated phone-based home gateway system 78 provides gateway functionality, broadband communications, short-range and/or long-range wireless communications, as well as normal voice telephony to the home environment. The wireless, integrated, phone-based home gateway interface 80 is a modular, flexible home network appliance, as well as broadband telephony and data communications device that provides short-range and long-range wireless in-home as well as to-home networking.

Exemplary Integrated Phone-based Home Gateway System Hardware Architecture

Figure 6A:
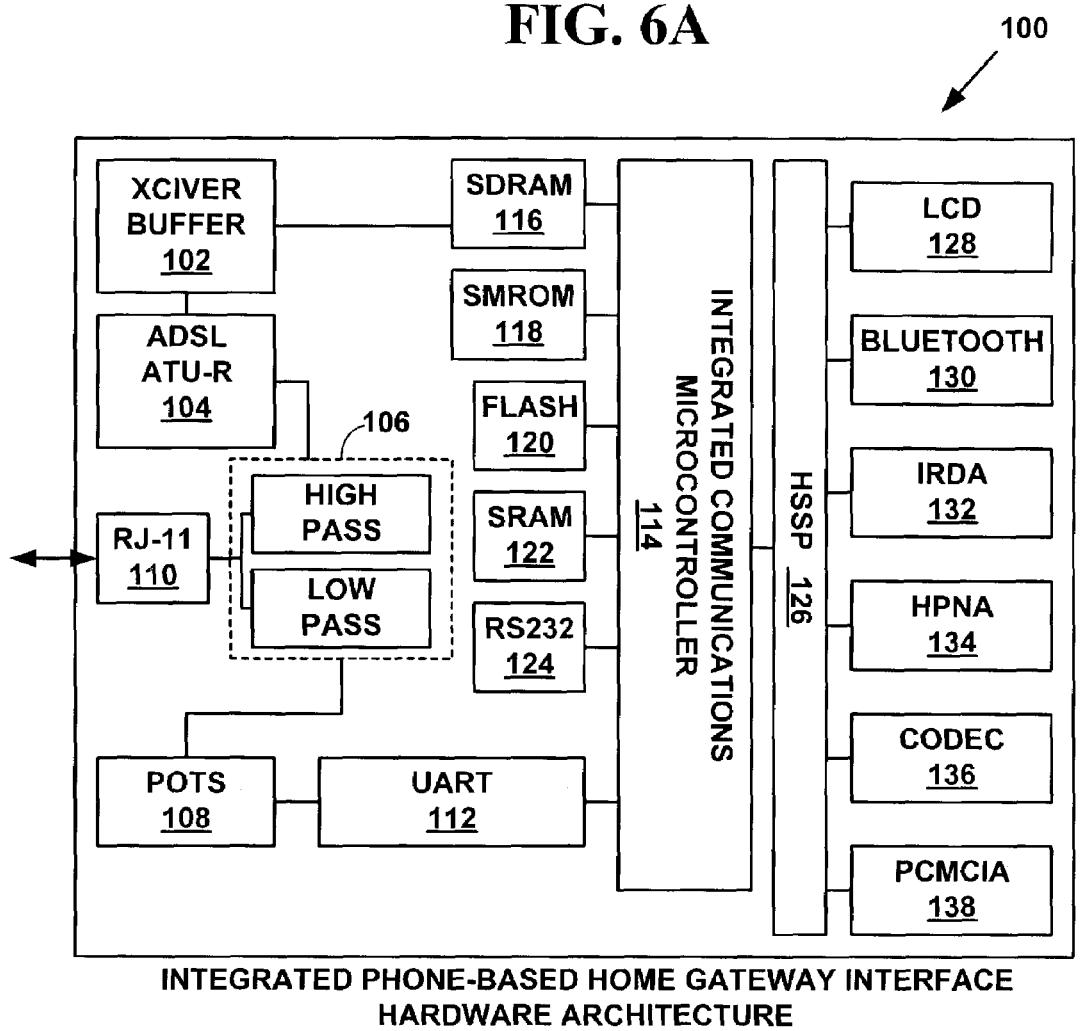
FIG. 6A is a block diagram illustrating an exemplary integrated phone-based home gateway interface architecture.
Figure 6B:
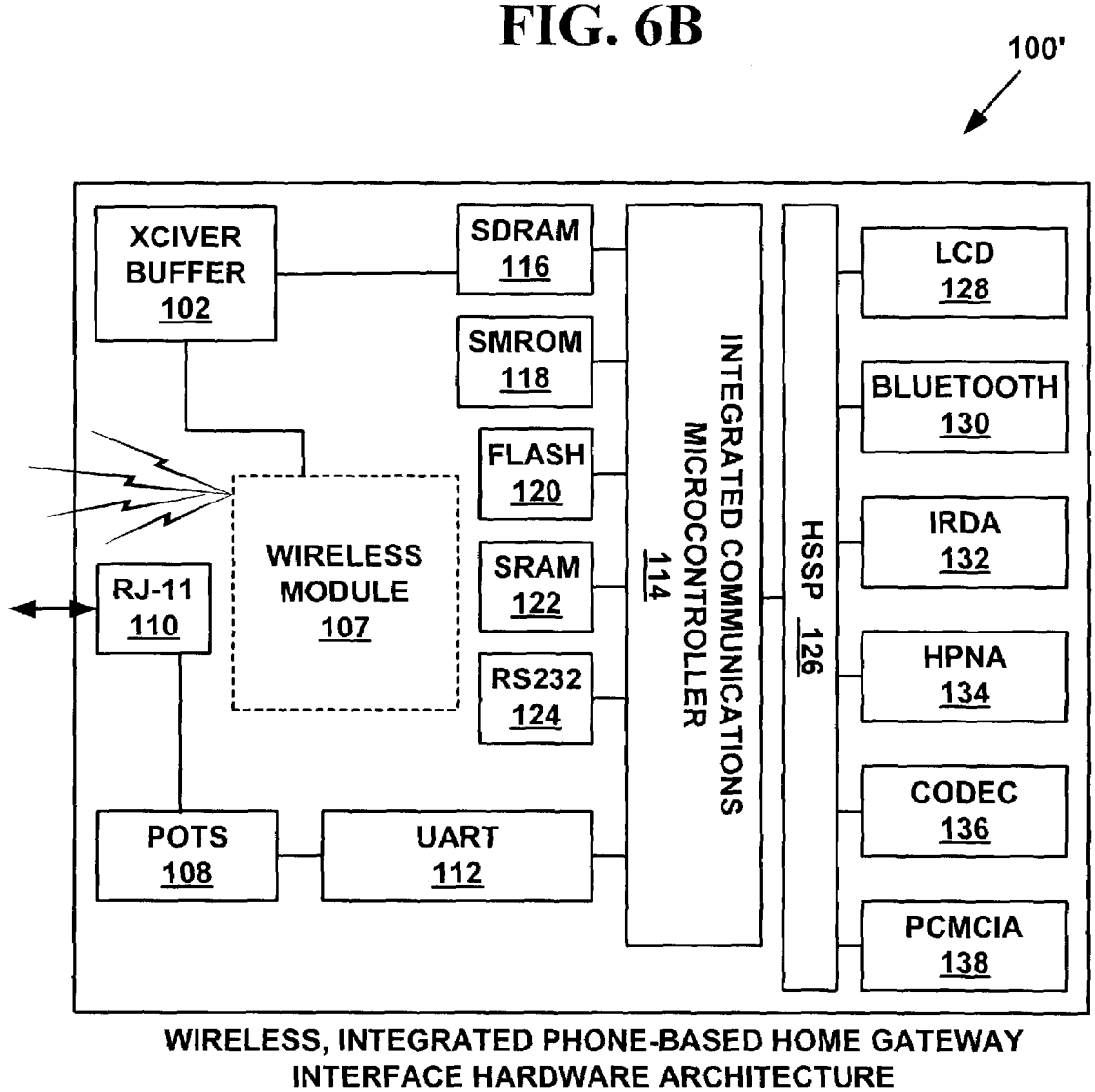
FIG. 6B is a block diagram illustrating an exemplary wireless, integrated phone-based home gateway interface architecture.

FIG. 6A is a block diagram illustrating an exemplary integrated phone-based home gateway interface hardware architecture 100. FIG. 6B is a block diagram illustrating an exemplary wireless, integrated phone-based home gateway interface hardware architecture 100'. The exemplary phone-based home gateway interface architecture 100 illustrated in FIG. 6A is used with the integrated phone-based home gateway interface 36 (FIG. 3). The exemplary wireless, integrated phone-based home gateway interface hardware architecture 100' is used with the wireless, integrated phone-based home gateway interface 80 (FIG. 4).

The exemplary integrated phone-based home gateway interface architecture 100 includes a receive and transmit or transceiver ("XCIVER") buffer 102, an ADSL ATU-R 104, a splitter 106 including a high-pass filter and a low pass filter, a POTS telephone module 108 and a RJ-11 interface 110. An expansion header (not illustrated) may also be used between the ATU-R 104 and the XCIVER buffer 102.

The POTS telephone module 108 may include an analog V.90 59K modem, other analog or digital modem and/or a 900 MHz-2.4 GHz cordless phone module (Not illustrated in FIG. 6A). The POTS telephone module 108 is connected to a universal asynchronous receiver-transmitter ("UART") 112, which is turn connected to an integrated communications micro-controller 114.

An ADSL system typically includes one or more splitters 106. The splitter 106 is a filter that separates high frequency and low frequency telephony signals. A splitter may be integrated the ATU-R 104, physically separated from ATU-R 104, and may be divided between high pass and low pass functionality as is illustrated in FIG. 6A.

In one exemplary preferred embodiment of the present invention, the ADSL ATU-R 104 is used with the splitter 106 and is compliant with the ANSI standard "Network and Customer Installation Interfaces—Asymmetric Digital Subscriber Line (ADSL) Metallic interface," ANSI-T1.413-1995, and the ITU standards "Asymmetrical digital subscriber line (ADSL) transceiver," ITU-G.992.1-1999, the contents of which are incorporated by reference.

In another exemplary preferred embodiment of the present invention, the ADSL ATU-R 104 is used without splitter 106. A splitterless ADSL system typically delivers a maximum downstream bandwidth of about 1.4 Mbps, but is less sensitive to noise and other transmission problems typically encountered by ADSL system that use splitters. The splitterless ADSL standard is called "G.lite." In such a splitterless embodiment, the ADSL ATU-R 104 is compliant with the ANSI-T1.413-1995 standard and the ITU-T "Splitterless Asymmetrical Digital Subscriber Line Transceivers," ITU-G.992.2-1999, the contents of which are incorporated herein by reference.

In another embodiment of the present invention, the ADSL ATU-R 104 is replaced with a high-speed wireless interface 107 as is illustrated in FIG. 6B. This high-speed wireless interface 107 provides a "wireless local loop" ("WLP") for use in wireless, integrated, phone-based home gateway interface 84 (FIG. 4), to provide in-home and as well as to-home wireless networking. In one embodiment of the present invention, the high-speed wireless interface is an IEEE 802.11b wireless interface. However, the present invention is not limited to such a wireless interface, and the high-speed wireless interface 107 include other or equivalent short-range or long-range wireless interfaces.

In such an embodiment, the high-speed wireless interface 107 is used without the ADSL ATU-R 104, but in combination with the RJ-11 interface 110 and the POTS telephone module 108. In such an embodiment, the RJ-11 interface 110 and the POTS telephone module 108 are used to provide service provisioning and voice calls via the PSTN 22 that can be connected to other wireless devices via the high-speed wireless interface 107. In such an embodiment, the high-speed wireless interface 107 is also connected to the POTS telephone module 110.

In yet another embodiment of the present invention (not illustrated in FIG. 6), the high-speed wireless interface 107 is used in combination with the ADSL ATU-R 94, the RJ-11 interface 108 and the POTS telephone module 110 to provide both wireless and wired access to integrated, phone-based home gateway interface 36 (FIG. 3). For one skilled in the art, various other combinations of the wireless and wired components described herein are also possible to provide both data and voice communications in a phone-based home gateway.

In one embodiment of the present invention, the integrated communications micro-controller 114 includes a StrongARM SA-110, from the Intel Corporation of Santa Clara, Calif. The StrongARM SA-110 is a high-performance, low-power processor for portable wireless multi-media devices. However, other or equivalent micro-controllers can also be used and the present invention is not limited to this Intel micro-controller.

The integrated phone-based home gateway interface architecture 100 also includes one or more banks of memory such as synchronous dynamic random access memory ("SDRAM") 116, synchronous mask read only memory ("SMROM") 118, flash memory 120, static RAM ("SRAM") 122 and one or more RS-232 interfaces 124 for connecting serial devices. Memory 116, 118, 120, 122 and RS-232 interfaces 124 are connected to the integrated communications micro-controller 114.

As is known in the art, SDRAM 116 is a form of dynamic random access memory ("DRAM") that can run at higher clock speeds than conventional DRAM. The SDRAM 116 is connected to receive and transmit buffer 102. SMROM 118 is a form of ROM that can be accessed using bit-masks that are typically 32-bits in size. Flash memory 120 is special type of erasable programmable ROM that can be erased and reprogrammed in blocks instead of one byte at a time. SRAM 122 is form of RAM that retains information as long as there is enough power to run a device. The RS-232 interface 124 standard defines specific lines and signal characteristics used by serial communications controllers to standardize the transmission of serial data between devices.

In a typical configuration memory 116, 118, 120, 122 includes memory blocks of 64 Mbytes to 512 Mbytes in size. The memory 116, 118, 120, 122 can be configured using many different types of memory layouts and memory sizes.

The integrated communications micro-controller 114 is connected with one or more high-speed serial ports ("HSSP") 126 or a high-speed serial bus (not illustrated) to a black and white, grey scale or color liquid crystal display ("LCD") component 128 used for the display screen 40, a Bluetooth radio module 130 included in the Bluetooth component 52, an infra data association ("IrDA") module 132, an HPNA module 134 included in the HPNA component 50, one more audio/video CODEC modules 136, and one or more Personal Computer Memory Card International Association ("PCMCIA") interface modules 138.

As is known in the art, the IrDA module 132 is used for synchronizing and transmitting data via infrared light waves and is used to provide one type of short-range wireless connection. The audio/video CODECs 136 are coders/decoders used to convert audio or video signals between analog and digital forms and/or are compressors/decompressors for compressing and decompressing audio and video data.

In one embodiment of the present invention, Motion Pictures Expert Group ("MPEG-2") codecs are used. As is known in the art, MPEG is a set of standards for audio and video compression established by the Joint ISO/IEC Technical Committee on Information Technology. The original MPEG standard for storing and retrieving video and audio information, was designed for CD-ROM technology. MPEG-1 defines data cell encoding for a medium bandwidth of up to 1.5 Mbps, two audio channels, and non-interlaced video. MPEG-2 is an extension of the MPEG-1 standard designed for broadcast television, including HDTV. MPEG-2 defines a higher bandwidth of up to 40 Mbps, five audio channels, a wider range of frame sizes, and interlaced video.

MPEG-2 in general is defined in the ISO/IEC Standard JTC1/SC29/WG11, entitled "Coding of Moving Pictures and Audio," incorporated herein by reference. MPEG-2 is also defined by the ITU-T H.222.0, standard entitled "Generic coding of moving pictures and associated audio information," the contents of which is incorporated by reference. However, other audio/video data codecs could also be used and the present invention is not limited to the MPEG codecs described.

During an audio/video conferencing call, or a voice call, audio information is typically supplied by audio equipment (e.g., a handset, microphone/speaker, speakerphone, etc.) that uses an audio codec to capture audio information. For example, such audio codecs are compliant ITU-T G.711, G.722, G.723, G.728 and G.729 standards, the contents of which are incorporated by reference. However, other audio codecs could also be used and the present invention is not limited to such audio codecs.

The one or more PCMCIA interfaces 148 are standard interfaces for small credit-card size peripherals and slots designed to hold them, primarily on laptop, palmtop, and other portable devices including intelligent electronic devices. As is known in the art, PCMCIA interfaces 138 comprises group of manufacturers and vendors who collaborated to promote a common standard for PC Card-based peripherals.

The integrated phone-based home gateway interface architecture 100 system and wireless, integrated phone-based home gateway interface architecture 100' are described with a number of specific components. However, the present invention is not limited to these specific components and more, fewer or equivalent components can also be used in the integrated phone-based home gateway interface architecture 100 and wireless, integrated phone-based home gateway interface architecture 100'

Exemplary Home Gateway Interface Software Architecture

Figure 7:
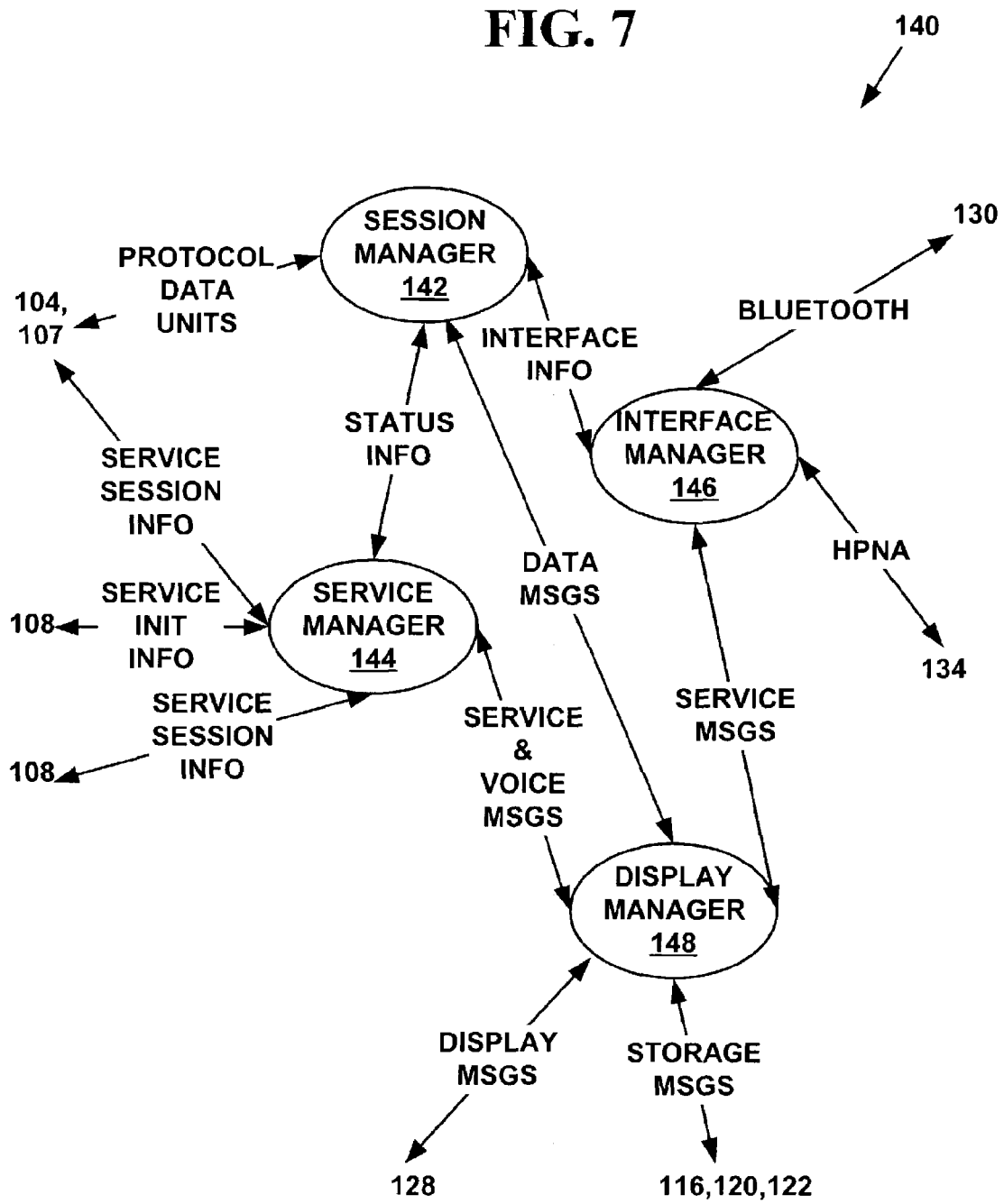
FIG. 7 is a block diagram illustrating an exemplary phone-based home gateway interface software architecture.

FIG. 7 is a block diagram illustrating an exemplary home gateway interface software architecture 140. The home gateway interface software architecture 140 includes a session manager 142, a service manager 144, an interface manager 146 and a display manger 148. However, more, fewer or equivalent software components can be used and the present invention is not limited to these software components. In FIGS. 7-11, external communications paths, i.e., communications paths external to a component in the software architecture 140 are illustrated with two-way arrows. Internal communications paths, i.e., communications paths internal to a component in the software architecture 140 are illustrated with lines without arrow heads. However, the internal communications path also provide two-way communications.

Figure 8:
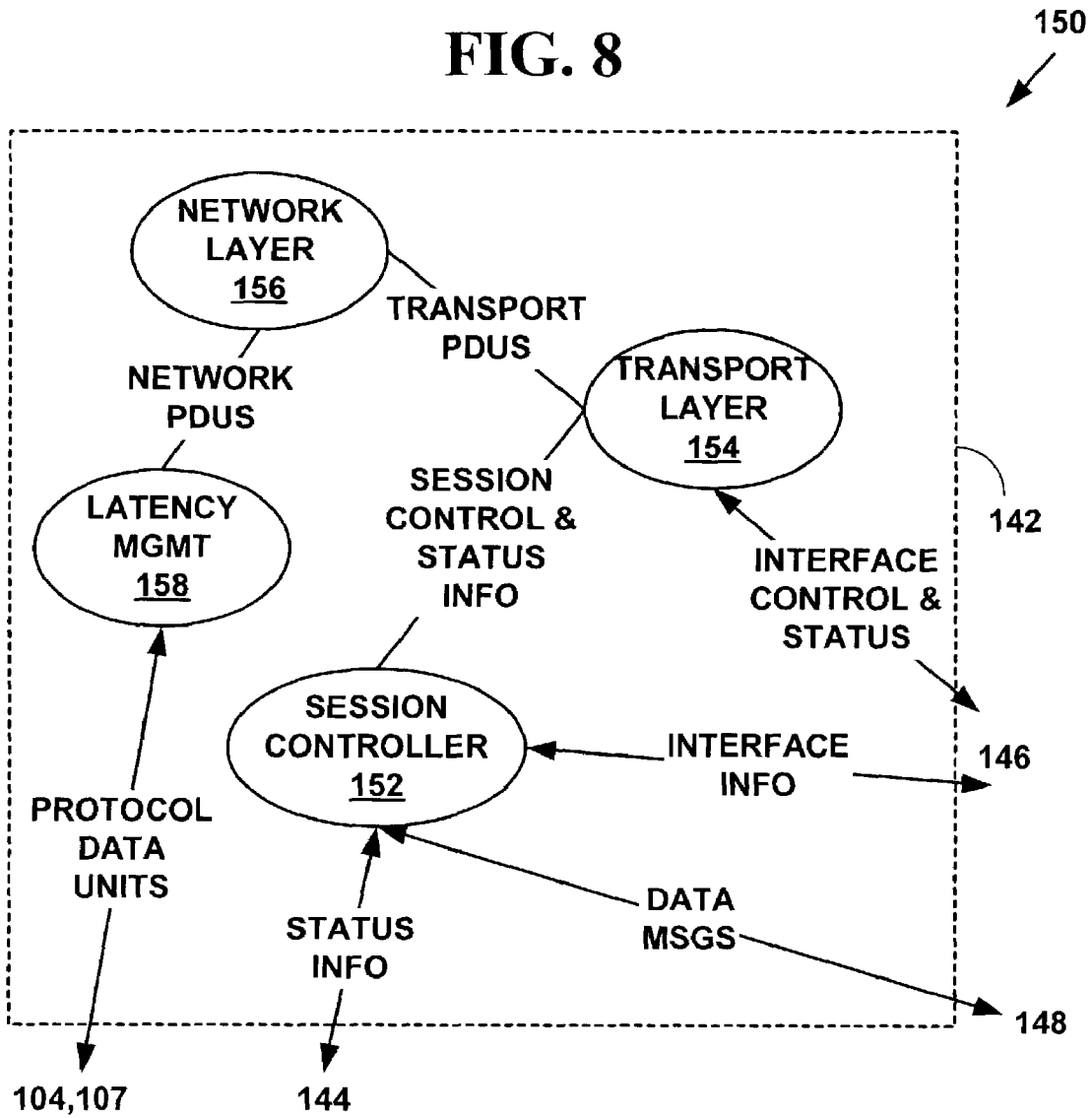
FIG. 8 is a block diagram illustrating an exemplary session manager software architecture.

FIG. 8 is a block diagram illustrating an exemplary session manager 142 software architecture 150. The session manager 142 includes a session controller module 152 that sends and receives status information to and from the service manager 144. The session controller module 152 also sends and receives interface information to and from the interface manager 146 and sends and receives data messages to and from the display manager 148. The session controller module 152 also helps initialize data interfaces, such as IP interfaces with cooperation from the provisioning manager module 164 (FIG. 9) in the service manager 144.

The session controller module 152 also sends and receives session control and status information to and from a transport layer 154 that is in communications with a network layer 156.

As is known in the art, the Open Systems Interconnection ("OSI") reference model is a layered architecture that standardizes levels of service and types of interaction for computers exchanging information through a communications network. The OSI reference model separates network device-to-network device communications into seven protocol layers, or levels, each building—and relying—upon the standards contained in the levels below it. The OSI reference model includes from lowest-to-highest, a physical, data-link, network, transport, session, presentation and application layer. The lowest of the seven layers deals solely with hardware links; the highest deals with software interactions at the application-program level.

The transport layer 154 is the fourth of the seven layers in the OSI reference model. The transport layer 154 is typically responsible for both quality of service and accurate delivery of information. Among the tasks performed on this layer are error detection and correction.

The transport layer 154 sends and receives transport layer protocol data units ("PDU") to and from the network layer 156. As is known in the art, a PDU is a data packet layout with a header and a data payload. The transport layer 154 also sends and receives session control and status information to and from the session controller module 152 and sends and receives interface control and status information to and from the interface manager 146.

The network layer 156 is the third of the seven layers in OSI reference. The network layer 156 is one level above the data-link layer and ensures that information arrives at its intended destination. The network layer 156 sends network layer PDUs to a latency management module 158. The latency management module 158 manages latency of information on the network layer 156. The latency management module 158 sends and receives protocol data units to and from the ADSL ATU-R 104 and/or wireless RF module 107.

Figure 9:
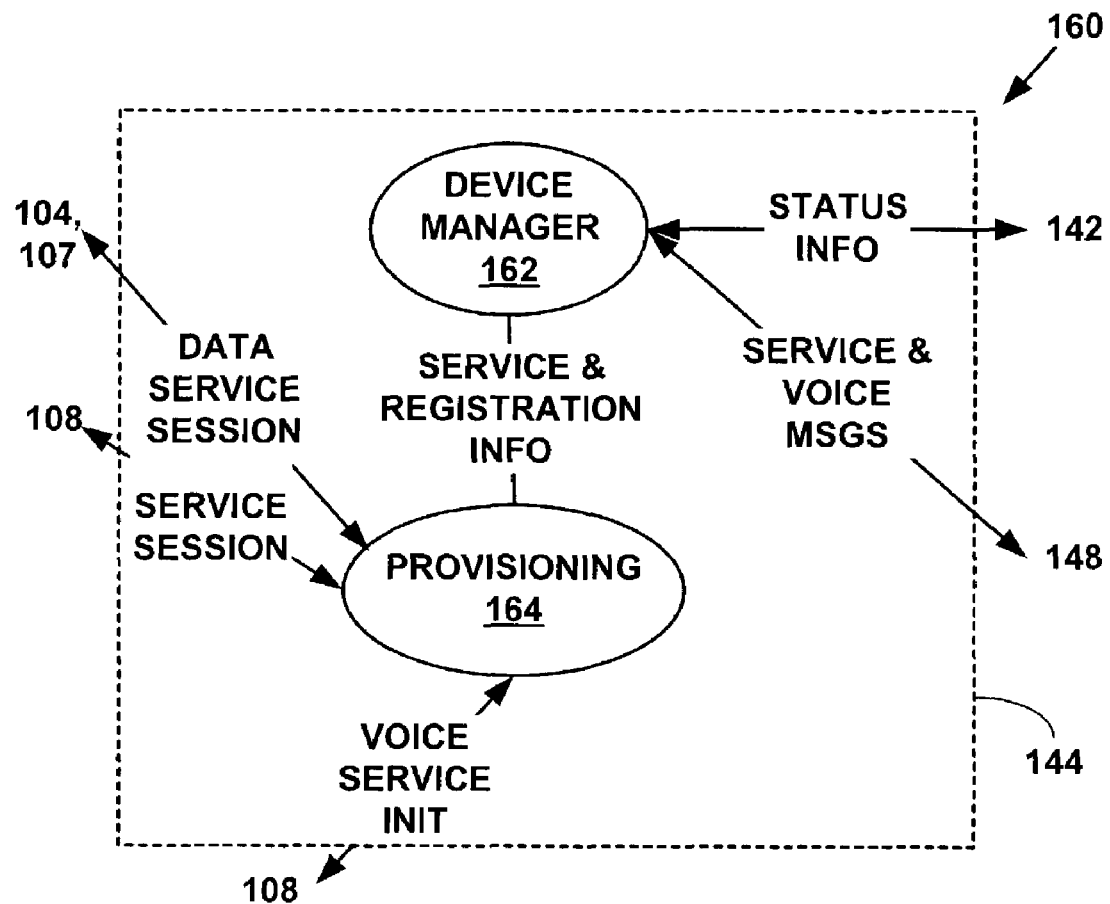
FIG. 9 is a block diagram illustrating an exemplary service manager software architecture.

In one embodiment of the present invention, the session controller module 152 provides routing and bridging functionality for networking communications and coordinates initialization of broadband communications service configurations and provisions with the provisioning manager module 164 in the service manager 144 (FIG. 9). In such an embodiment, the session controller module 152 in the session manager 142 initializes and maintains routing and bridging tables for the phone-based home gateway interfaces 36, 80. However, the present invention is not limited to such and embodiment and routing and bridging functionality can also be provided by other hardware or software components in the integrated, phone-based home gateway interfaces 36, 80.

FIG. 9 is a block diagram illustrating an exemplary service manager 144 software architecture 160. The service manager 144 includes a device manager module 162 that sends and receives status information to and from the session manager 142, and sends and receives service and voice information messages to and from the display manager 148.

The device manager module 162 also sends and receives service registration information to and from a provisioning manager module 164. The provisioning manager module 164 sends and receives service initialization information and service session information to and from the PSTN 22 via the POTS telephone module 108. The POTS telephone module 108 helps with service provisioning requests as well as handles voice calls including VoIP via the PSTN 22. The provisioning manager module 164 also sends and receives broadband service session information and data session information to and from the ADSL ATU-R 104 or wireless module 107. The ADSL ATU-R 104 or wireless module 107 also handles data communications via the PSTN 22, the Internet, wireless WAN 94, etc.

As is known in the art, an Asynchronous Transfer Mode ("ATM") system can use high-speed services on ADSL systems as a physical layer to transport data packets. ATM is a high-speed packet transmission system. ATM segments and multiplexes data traffic into small, fixed-length units called "cells." A cell is 53-octects, with 5-octects for the cell header, and 48-octects for the cell data. ATM provides four service category classes that may use constant bit-rates, variable bit-rates, available bit-rates and unspecified bit-rate services. The four ATM service classes can be used to provide Quality-of-Service ("QoS") functionality. The provisioning manager module 164 is used to set-up ATM virtual channel connections ("VCC") and other types of virtual connections or data sessions.

Figure 10:
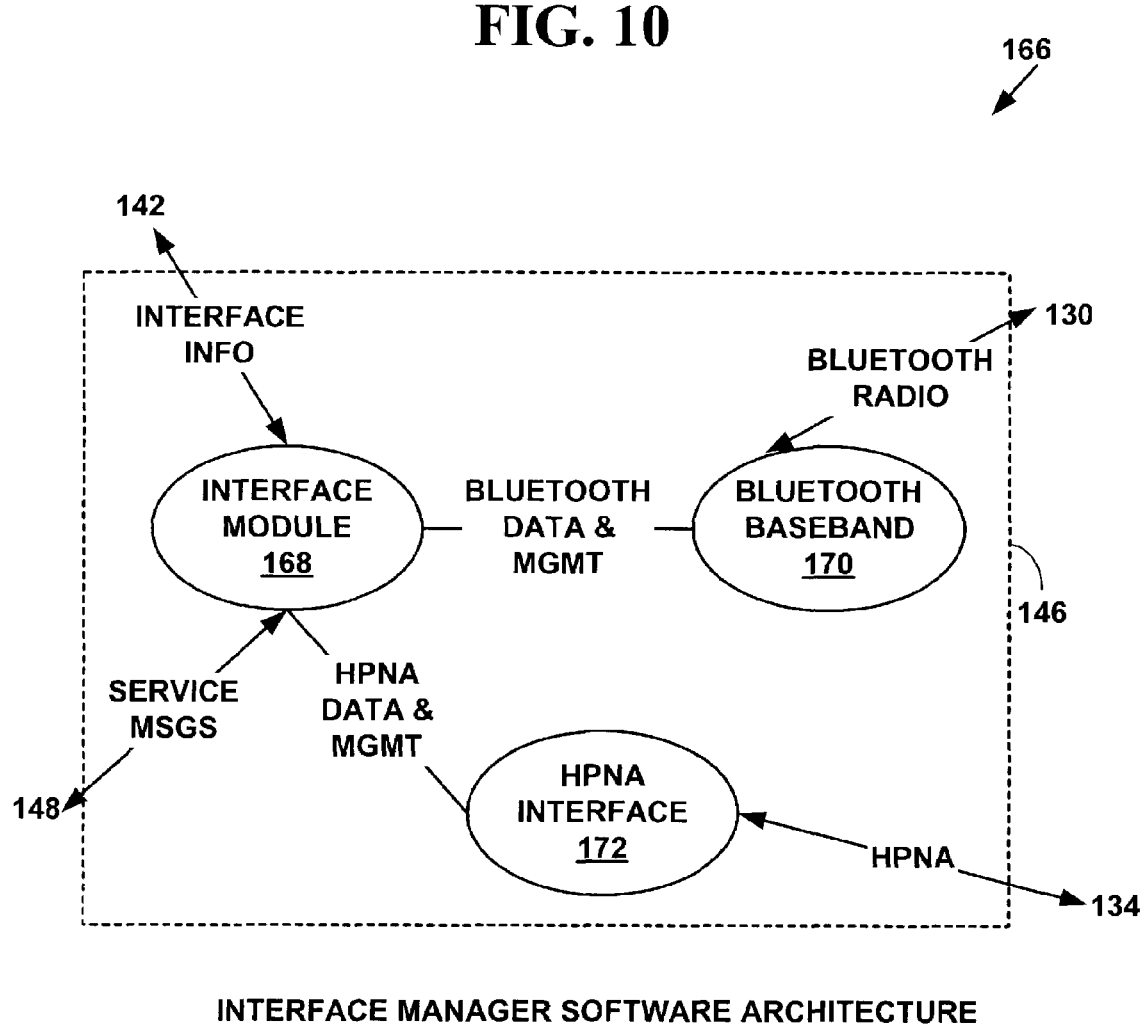
FIG. 10 is a block diagram illustrating an exemplary interface manger software architecture.

FIG. 10 is a block diagram illustrating an exemplary interface manger 146 software architecture 166. The interface manager 146 includes an interface module 168. The interface module 168 sends and receives interface information to and from the session manager 142 and sends and receives service messages to and from the display manager 148.

The interface module 168 also sends and receives Bluetooth data and management information to and from a Bluetooth baseband module 170. The Bluetooth baseband module 170 sends and receives Bluetooth radio information to and from the Bluetooth radio module 130.

The interface module 168 also sends and receives HPNA data and management information to and from an HPNA interface module 172. The HPNA interface module 172 sends and receives HPNA information to and from HPNA module 134.

Figure 11:
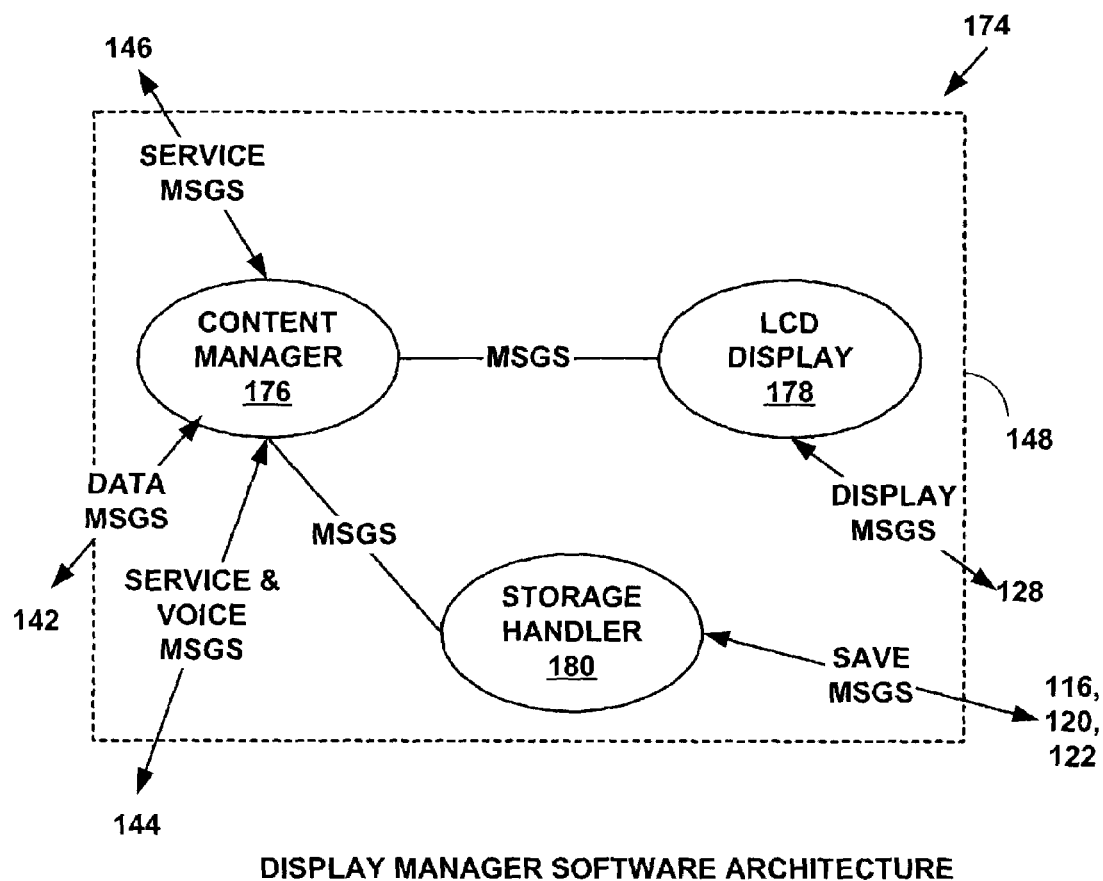
FIG. 11 is a block diagram illustrating an exemplary display manager software architecture.

FIG. 11 is a block diagram illustrating an exemplary display manger 148 software architecture 174. The display manager 148 includes a content manager module 176. The content manager module 176 sends and receives data messages to and from the session manager 142, sends and receives services and voice messages to and from the service manager 144 and sends and receives service messages to and from the interface manger 146.

The content manager module 176 also sends and receives messages to and from a LCD display module 178 and a storage handler module 180. The LCD display module 178 sends and receives display messages to and from the LCD module 128. The storage handler module 180 sends and receives storage messages to and from memory 116, 120, 122.

FIGS. 1-5 illustrate exemplary stand-alone integrated phone-based home gateway systems. In many instances however, a home user will already have an existing phone system, and desire to use the functionality of the integrated or wireless, integrated phone-based home gateway systems described herein. In another embodiment of the present invention, the integrated phone-based home gateway system comprises an integrated phone-based home gateway conversion system without a display screen 40, keypad 42, optical video camera 54, etc.

Figure 12:
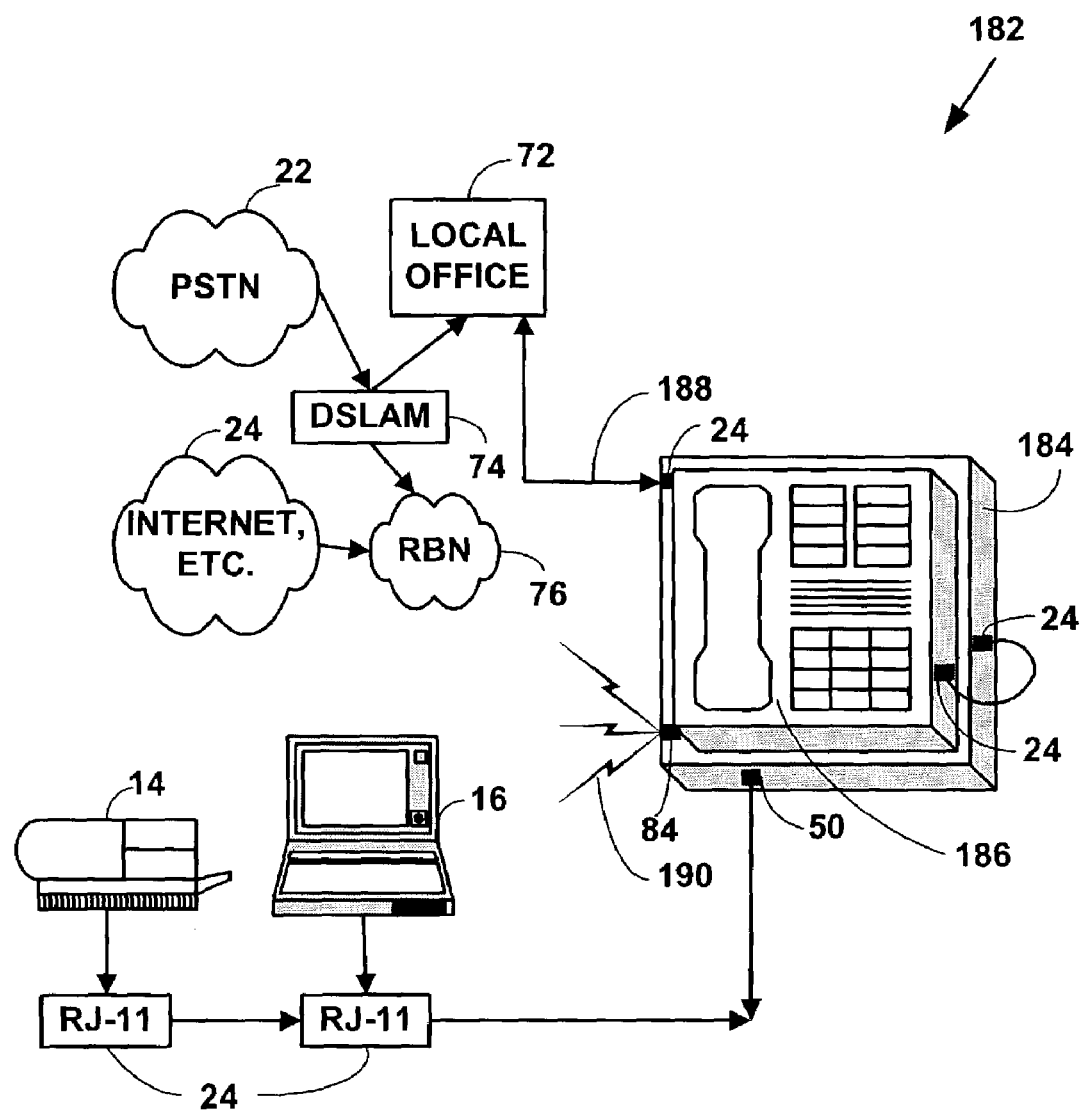
FIG. 12 is a block diagram illustrating an integrated phone-based home gateway conversion system for an existing phone system.

FIG. 12 is a block diagram illustrating an integrated phone-based home gateway conversion system 182. The integrated phone-based home gateway conversion system 182 includes an integrated phone-based home gateway conversion module 184 that is used in combination with an existing phone system 186. In one embodiment of the present invention, the integrated phone-based home gateway conversion module 184 is approximately the same size and shape of the existing phone system 182 and includes multiple RJ-11 jacks 24, a HPNA 50 connector as well as other communications components described above for phone-based home gateway systems 34, 78. The multiple RJ-11 jacks and the HPNA 50 connector allow the existing phone system 186 to be connected to the integrated phone-based home gateway conversion module 184, other devices on LAN 12 in a SOHO network, as well as to the PSTN 22 and/or Internet 24.

Since the integrated phone-based home gateway conversion module 184 is approximately the same size and shape of the existing phone system 182, the conversion module 184 can be used with an existing phone system 182 without taking up much additional space in the home or office of a home user. The size of the illustrated conversion module 184 is slightly larger than the existing phone system only for the purposes of illustration in the drawing. The integrated phone-based home gateway conversion module 184 includes wired 188 and/or wireless 190 connections as were discussed above for the integrated and wireless integrated home gateway systems 34, 78.

Exemplary Home Gateway Interface Initialization

FIG. 13 is a flow diagram illustrating a Method 192 for initializing communications from the phone-based home gateway interfaces 36, 80. At Step 194, one or more narrow-band communications channels are automatically established with a public switched telephone network 22 from the phone-based home gateway interfaces 36, 80. At Step 196, one or more broadband communications channels are automatically established with a public switched telephone network 22 from the phone-based home gateway interfaces 36, 80. At Step 198, a data communications interface is automatically initialized for a data network 24 from the phone-based home gateway interfaces 36, 80. At Step 200, routing or bridging tables are automatically initialized on the phone-based home gateway interfaces 36, 80. At Step 202, broadband communications service configurations and provisions are automatically initialized via the phone-based home gateway interfaces 36, 80.

Method 192 helps hide data and broadband configuration and service provisioning complexity from home users by automatically establishing communications channels and providing automatic initialization communications and networking configuration parameters. Method 192 is illustrated with one exemplary embodiment of the present invention. However, the present invention is not limited to such an embodiment and other or equivalent embodiments can also be used.

In such an embodiment at Step 194, one or more narrow-band communications channel, such as an analog 48 communication channels for POTS 108, are established automatically with the PSTN 22 from the phone-based home gateway interfaces 36, 80.

In one embodiment of the present invention, the narrow-band communications channel is used to provide a conventional wired voice channel, communications channel redundancy, as well as provide automatic broadband service provisioning and configuration. In such an embodiment the narrow-band communications channel is also used to help initialize other components of the phone-based home gateway interfaces 36, 80. However, the present invention is not limited to such and embodiment.

At Step 196, one or more broadband communications channels such as an ADSL 104, ATM over ADSL 104 or other broadband communications channel is established automatically with the PSTN 22. In one embodiment of the present invention, the broadband communications channel is used to provide broadband voice, video or data communications with the PSTN 22 or Internet 24. However, the present invention is not limited to such an embodiment.

At Step 198, a data communications interface is automatically initialized, such as an IP interface, for the Internet 24. The automatic initialization includes initializing network addresses such as IP and other types of network addresses, and initializing data network configuration parameters. The automatic initialization helps hide initialization and configuration complexity from users of the home gateway interfaces.

At Step 200, routing or bridging tables are automatically initialized in the communications interface 44. As is known in the art, a routing table is table of information that provides network hardware (bridges and routers) with the directions needed to forward packets of data to locations on other networks. The information included in a routing table differs according to whether it is used by a bridge or a router.

A bridge relies on both a source (i.e., originating) and destination addresses to determine where and how to forward a packet. A router relies on the destination address and on information in the table that gives the possible routes—in hops or in number of jumps—between itself, intervening routers, and a destination. The routing or bridging tables also provide network address translation ("NAT") for the phone-based home gateway interfaces 36, 80. In one embodiment of the present invention, the routing and bridging tables are initialized by the session manager 142. However, the present invention is not limited to this embodiment and the routing and bridging tables can be initialized by other components or modules in the phone-based home gateway interfaces 36, 80 and/or with or without help from the remote applications.

At Step 202, broadband communications service configurations and provisions are automatically initialized via the phone-based home gateway interfaces 36, 80. In one embodiment of the present invention, the session manager 142 coordinates this task with the provisioning manager module 164 in the service manager 148. However, the present invention is not limited to such an embodiment. The narrow-band communications channel is used to automatically initialize broadband communications services, such as ASDL, ATM, etc. services.

In a preferred embodiment of the present invention, Method 192 is practiced with the phone-based home gateway interfaces 36, 80 by sending and receiving telephony initialization and provisioning signals to and from the PSTN 22, and data protocol initialization sequences to and from the Internet 24, to provision, establish and initialize narrow-band and broadband communications channels and automatically populate routing and bridging tables.

In another embodiment of the present invention, the narrow-band communication channel is used to call a toll free number (e.g., 800, 888, etc.) to establish communications with specialized remote software applications that assist in automatically populating routing and bridging tables and provisioning, establishing and initializing communications channels to/from the phone-based home gateway interfaces 36, 80. In such an embodiment, the remote applications may be included at the local switching office 72 or at some other location on the PSTN 22 or the Internet 24 (e.g., at Aeptech's home site on the Internet).

In such an embodiment, the remote applications specifically help configure and initialize the phone-based home gateway interfaces 36, 80 with two-way dynamic communications any time a home user desires to configure and initialize an interface 36, 80. The dynamic two-way communications over the narrow-band communications channel are used to assist in automatically populating routing and bridging tables, provisioning, establishing and initializing other communications channels to/from the phone-based home gateway interfaces 36, 80.

In another embodiment of the present invention, a remote application may send a static configuration file that is then used by the phone-based home gateway interfaces for automatically populating routing and bridging tables and provisioning, initializing and establishing other communications channels to/from the phone-based home gateway interfaces 36, 80. The configuration file can be dynamically updated by periodically contacting the remote application for updates.

However, the present invention is not limited to such embodiments and other or equivalent embodiments can also be used. In addition, no remote software applications are necessary to practice preferred embodiments of present invention.

The phone-based home gateway interfaces described herein can used as broadband home gateway, a wireless local loop home gateway, as well as a set-top box for a cable television access. The phone-based home gateway interfaces are modular, flexible, plug-n-play home gateways. The home gateway interfaces hide routing and bridging table population, data (e.g., IP) and broadband service configuration and provisioning complexity from home users by providing automatic population of routing and bridging tables, establishment of communications channels, initialization and provisioning of communication channel parameters.

It should be understood that the programs, processes, methods and system described herein are not related or limited to any particular type of computer or network system (hardware or software), unless indicated otherwise. Various combinations of general purpose, specialized or equivalent computer components including hardware, software, and firmware and combinations thereof may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more fewer or equivalent elements may be used in the block diagrams.

The claims should not be read as limited to the described order or elements unless stated to that effect. Therefore, all embodiments that come within the scope and spirit of the following claims and equivalents thereto are claimed as the invention.

We claim:

1. An integrated phone-based home gateway system, comprising in combination:

a home gateway interface for initializing wireless and wired broadband communications, for providing gateway, routing and bridging for wireless and wired broadband networking communications andfor automatic service provisioning for allocating, configuring and maintaining multiple transmission channels and virtual communications paths used for wired and wireless broadband communications, wherein initializing wireless and wired broadband communications includes initializing automatically wired and wireless broadband communications service configurations and provisions from the home gateway interface and initializing automatically one or more gateway, routing and bridging tables on the home gateway interface, and wherein the home gateway interface further includes an automatic provisioning manager module for automatic service provisioning for wired and wireless broadband communications wherein the automatic provisioning manager module includes automatically initializing wired and wireless broadband communications service configurations and provisions and automatically establishing one or more wired and wireless broadband communications channels and one or more wired and wireless broadband virtual communications paths;

a wired communications interface for connecting to external wired devices, for connecting to one or more wired broadband communications networks and for providing wired broadband communications, wherein the wired communications interface includes one or more transmission channels and virtual communications paths for voice communications and for Voice-over-Internet Protocol (VoIP) communications automatically provisioned by the home gateway interface, wherein the wired communications interface includes establishing one or more Internet Protocol (IP) data communications channels;

a wireless communications interface for connecting to external wireless devices, for connecting to one or more wireless broadband communications networks, for providing wireless broadband communications, wherein the wireless communications interface includes one or more broadband communications channels for voice communications and for Voice-over-Internet Protocol (VoIP) communications automatically provisioned by the home gateway interface; and a multi-function telephony handset for providing telephony communications.

2. The integrated phone-based home gateway system of claim 1 wherein the wired communications interface includes a copper wire, coaxial cable, or fiber-optic cable interface.

3. The integrated phone-based home gateway system of claim 2 wherein the copper wire interface includes a digital subscriber line (DSL) interface.

4. The integrated phone-based home gateway system of claim 1 wherein the wireless communications interface includes a Bluetooth protocol interface, an 802.11b protocol interface, RF Home protocol interface, Shared Wireless Access Protocol interface or Wireless Application Protocol interface.

5. The integrated phone-based home gateway system of claim 1 wherein the wireless communications interface includes a short-range wireless communications interface for connecting to external wireless network devices on a wireless piconet.

6. The integrated phone-based home gateway system of claim 1 wherein the wireless communications interface includes a long-range wireless communications interface for connecting to external wireless network devices on a wireless wide area network.

7. The integrated phone-based home gateway system of claim 1 wherein the wireless communications interface includes a long-range and a short-range radio frequency (RF) wireless communications interface.

8. The integrated phone-based home gateway system of claim 1, wherein the multi-function telephony handset performs telephony functions for at least one of a cordless phone, a mobile phone, a web phone, or a walkie-talkie radio.

9. The integrated phone-based home gateway system of claim 1 further comprising a Universal Serial Bus (USB) interface including plug-and-play installation capabilities.

10. The integrated phone-based home gateway system of claim 1 further comprising a display interface for displaying information from the home gateway interface, wired communications interface and wireless communications interface.

11. The integrated phone-based home gateway system of claim 1 wherein the wireless communications interface includes a wireless communications interface for connecting to a wireless Small Office Home Office (SOHO) network.

12. A method for initializing a broadband integrated phone-based home gateway system, comprising:

establishing automatically one or more broadband communications channels from a home gateway interface on the broadband integrated phone-based home gateway system, wherein the home gateway interface includes initializing wireless and wired broadband communications, initializing automatically wired and wireless broadband communications service configurations and provisions from the home gateway interface and initializing automatically one or more gateway, routing and bridging tables on the home gateway interface, and wherein the home gateway interface further includes an automatic provisioning manager module for automatic service provisioning for wired and wireless broadband communications wherein the automatic provisioning manager module includes automatically initializing wired and wireless broadband communications service configurations and provisions and automatically establishing one or more wired and wireless broadband communications channels and one or more wired and wireless broadband virtual communications paths, wherein the home gateway interface a wired communications interface for connecting to external wired devices, for connecting to one or more wired broadband communications networks and for providing wired broadband communications, wherein the wired communications interface includes one or more transmission channels and virtual communications paths for voice communications and for Voice-over-Internet Protocol (VoIP) communications automatically provisioned by the home gateway interface, wherein the home gateway interface includes a wireless communications interface for connecting to external wireless devices, for connecting to one or more wireless broadband communications networks, for providing wireless broadband communications, wherein the wireless communications interface includes one or more broadband communications channels for voice communications and for Voice-over-Internet Protocol (VoIP) communications automatically provisioned by the home gateway interface; and establishing an Internet Protocol (IP) data communications channel from the home gateway interface.

13. The method of claim 12 further comprising a computer readable medium having stored therein computer executable instructions for causing a processor to execute the steps of the method.

14. The method of claim 12 wherein the step of establishing one or more broadband communications channels includes establishing one or more radio frequency (RF), asymmetric digital subscriber line (ADSL), symmetric DSL (SDSL), high-bit-rate DSL (HDSL), very-high-bit-rate DSL (VDSL) or asynchronous transport mode (ATM) broadband communications channels.

15. The method of claim 12 wherein the step of initializing broadband communications service configurations and provisions includes initializing one or more radio frequency (RF), asymmetric digital subscriber line (ADSL), symmetric DSL (SDSL), high-bit-rate DSL (HDSL) very-high-bit-rate DSL (VDSL) or asynchronous transport mode (ATM) broadband service configurations and provisions.

* * * * *